United States Patent
Miyahara

(10) Patent No.: US 7,623,681 B2
(45) Date of Patent: Nov. 24, 2009

(54) SYSTEM AND METHOD FOR RANGE MEASUREMENT OF A PRECEDING VEHICLE

(75) Inventor: Shunji Miyahara, Yokohama (JP)

(73) Assignee: Visteon Global Technologies, Inc., Van Buren Township, MI (US)

(*) Notice: Subject to any disclaimer, the term of this patent is extended or adjusted under 35 U.S.C. 154(b) by 656 days.

(21) Appl. No.: 11/296,093

(22) Filed: Dec. 7, 2005

(65) Prior Publication Data

US 2007/0127779 A1    Jun. 7, 2007

(51) Int. Cl.
*G06K 9/00* (2006.01)
(52) U.S. Cl. .................................. 382/104; 701/65
(58) Field of Classification Search ................. 382/100, 382/103, 104, 164, 165, 169, 170, 181, 190, 382/195, 199; 701/1, 10, 65, 200
See application file for complete search history.

(56) References Cited

U.S. PATENT DOCUMENTS

| | | | |
|---|---|---|---|
| 4,556,986 A | 12/1985 | Craig | |
| 4,669,054 A | 5/1987 | Schlunt et al. | |
| 4,695,959 A | 9/1987 | Lees et al. | |
| 4,931,937 A | 6/1990 | Kakinami et al. | |
| 4,970,653 A | 11/1990 | Kenue | |
| 5,173,949 A | 12/1992 | Peregrim et al. | |
| 5,402,118 A * | 3/1995 | Aoki | 340/937 |
| 5,487,116 A | 1/1996 | Nakano et al. | |
| 5,515,448 A | 5/1996 | Nishitani | |
| 5,555,312 A | 9/1996 | Shima et al. | |
| 5,555,555 A | 9/1996 | Sato et al. | |
| 5,557,323 A | 9/1996 | Kajiwara | |
| 5,646,612 A | 7/1997 | Byon | |
| 5,757,287 A | 5/1998 | Kitamura et al. | |
| 5,850,254 A | 12/1998 | Takano et al. | |
| 5,887,080 A * | 3/1999 | Tsubusaki et al. | 382/172 |
| 5,930,383 A | 7/1999 | Netzer | |
| 5,937,079 A | 8/1999 | Franke | |
| 6,021,209 A | 2/2000 | Hirabayashi et al. | |

(Continued)

FOREIGN PATENT DOCUMENTS

DE    100 29 866 A1    2/2001

(Continued)

OTHER PUBLICATIONS

"Vision-Based Navigation of Mobile Robot with Obstacle Avoidance by Single Camera Vision and Ultrasonic Sensing", A. Ohya, A. Kosaka and A. Kak, 1997, pp. 704-711.

(Continued)

*Primary Examiner*—Anand Bhatnagar
(74) *Attorney, Agent, or Firm*—Brinks Hofer Gilson & Lione

(57) ABSTRACT

A system for determining range and lateral position of a vehicle is provided. The system includes a camera and a processor. The camera is configured to view a region of interest, including the vehicle, and generate an electrical image of the region. The processor is in electrical communication with the camera to receive the electrical image and analyzes the image by performing a pattern matching algorithm on the electrical image, based on a template. A score is determined based on the algorithm indicating the likelihood that certain characteristics of the electrical image actually correspond to the vehicle.

18 Claims, 17 Drawing Sheets

U.S. PATENT DOCUMENTS

| | | |
|---|---|---|
| 6,205,234 B1 | 3/2001 | Kakinami et al. |
| 6,285,393 B1 | 9/2001 | Shimoura et al. |
| 6,295,083 B1 | 9/2001 | Kuhn |
| 6,327,536 B1 | 12/2001 | Tsuji et al. |
| 6,430,303 B1 | 8/2002 | Naoi et al. |
| 6,445,809 B1 | 9/2002 | Sasaki et al. |
| 6,463,369 B2 | 10/2002 | Sadano et al. |
| 6,470,271 B2 | 10/2002 | Matsunaga |
| 6,477,260 B1 | 11/2002 | Shimomura |
| 6,484,086 B2 | 11/2002 | Jeon |
| 6,535,114 B1 | 3/2003 | Suzuki et al. |
| 6,590,521 B1 | 7/2003 | Saka et al. |
| 6,665,439 B1 | 12/2003 | Takahashi |
| 6,687,386 B1 * | 2/2004 | Ito et al. .................... 382/103 |
| 6,741,757 B1 | 5/2004 | Torr et al. |
| 6,754,369 B1 | 6/2004 | Sazawa |
| 6,760,061 B1 * | 7/2004 | Glier et al. ................. 348/149 |
| 6,775,395 B2 | 8/2004 | Nishigaki et al. |
| 6,822,563 B2 | 11/2004 | Bos et al. |
| 6,823,261 B2 | 11/2004 | Sekiguchi |
| 6,834,232 B1 | 12/2004 | Malhotra |
| 6,865,296 B2 | 3/2005 | Nagao |
| 6,879,249 B2 | 4/2005 | Takahashi |
| 6,909,802 B2 | 6/2005 | Nakamura |
| 6,927,758 B1 | 8/2005 | Piot et al. |
| 6,985,075 B2 | 1/2006 | Takeda |
| 7,042,389 B2 | 5/2006 | Shirai |
| 7,231,288 B2 | 6/2007 | Koulinitch |
| 2002/0001398 A1 | 1/2002 | Shimano et al. |
| 2002/0005778 A1 | 1/2002 | Breed et al. |
| 2002/0131620 A1 | 9/2002 | Shirato |
| 2002/0131621 A1 | 9/2002 | Ohta |
| 2002/0134151 A1 | 9/2002 | Naruoka et al. |
| 2002/0191837 A1 | 12/2002 | Takeda et al. |
| 2003/0001732 A1 | 1/2003 | Furusho |
| 2003/0011509 A1 | 1/2003 | Honda |
| 2003/0039546 A1 | 2/2003 | Tseng |
| 2003/0076414 A1 | 4/2003 | Sato et al. |
| 2003/0081815 A1 | 5/2003 | Shima et al. |
| 2003/0091228 A1 | 5/2003 | Nagaoka et al. |
| 2003/0099400 A1 | 5/2003 | Ishikawa |
| 2003/0108222 A1 | 6/2003 | Sato et al. |
| 2003/0125855 A1 | 7/2003 | Breed et al. |
| 2003/0128273 A1 | 7/2003 | Matsui et al. |
| 2003/0198389 A1 | 10/2003 | Wenzel et al. |
| 2003/0235327 A1 | 12/2003 | Srinivasa |
| 2004/0016870 A1 | 1/2004 | Pawlicki et al. |
| 2004/0054473 A1 | 3/2004 | Shimomura |
| 2004/0057601 A1 | 3/2004 | Honda |
| 2004/0062420 A1 | 4/2004 | Rohaly |
| 2004/0096082 A1 | 5/2004 | Nakai et al. |
| 2004/0175019 A1 | 9/2004 | Howard |
| 2004/0183906 A1 | 9/2004 | Nagaoka et al. |
| 2004/0189512 A1 | 9/2004 | Takashima et al. |
| 2004/0234136 A1 * | 11/2004 | Zhu et al. .................... 382/224 |
| 2004/0252863 A1 | 12/2004 | Chang et al. |
| 2005/0001715 A1 | 1/2005 | Itoh et al. |
| 2005/0015201 A1 | 1/2005 | Fields et al. |
| 2005/0036660 A1 | 2/2005 | Otsuka et al. |
| 2005/0063565 A1 | 3/2005 | Nagaka et al. |
| 2005/0190972 A1 | 9/2005 | Thomas et al. |
| 2005/0271254 A1 * | 12/2005 | Hougen ...................... 382/104 |
| 2006/0002587 A1 | 1/2006 | Takahama et al. |
| 2006/0200307 A1 * | 9/2006 | Riess ......................... 701/207 |
| 2007/0031008 A1 | 2/2007 | Miyahara |
| 2007/0035384 A1 | 2/2007 | Belcher et al. |
| 2007/0171033 A1 | 7/2007 | Nagaoka et al. |

FOREIGN PATENT DOCUMENTS

| | | |
|---|---|---|
| EP | 0 626 655 A2 | 11/1994 |
| EP | 1 179 803 A2 | 2/2002 |
| JP | 3170012 | 7/1991 |
| JP | 5020593 | 1/1993 |
| JP | 05-100278 | 4/1993 |
| JP | 5313736 | 11/1993 |
| JP | 8083392 | 3/1996 |
| JP | 9016782 | 1/1997 |
| JP | 10-255019 | 9/1998 |

OTHER PUBLICATIONS

"Forward Collision Warning with a Single Camera", E. Dagan, O. Mano, G. Stein, A, Shashua, 2004 IEEE, pp. 37-42.

"Vision based ACC with a Single Camera: Bounds on Range and Range Rate Accuracy", G. Stein, O. Mano, A. Shashua, 2003 IEEE, pp. 120-125.

Detection and Classification of Vehicles, Surendra Gupte, Osama Masoud, Robert F.K. Martin, Nikolaos P, Papanikolopoulous, IEEE Transactions on Intelligent Transportation Systems, vol. 3, No. 1, Mar. 2002, pp. 37-47.

Detection and Avoidance of Simulated Potholes in Autonomous Vehicle Navigation in an Unstructured Environment, Jaiganesh Karuppuswamy, Vishnuvardhanaraj Selvaraj, Meyyappa Murugappa Ganesh and Ernest L. Hall, Center for Robotics Research, University of Cincinnati.

Stereo Vision-based Vehicle Detection, M. Bertozzi, A. Broggi, A. Fascioli, S. Nichele, IEEE Intelligent Vehicles Symposium, Oct 3-5, 2002, pp. 39-44.

T. Kato, Y. Ninomiya and I. Masaki, An Obstacle Detection Method by Fusion of Radar and Motion Stereo, IEEE Intelligent Vehicles Symposium 2001, pp. 37-42, 2001.

H. Higashida, R. Nakamura, M. Hitotsuya, K.F. Honda and N. Shima, Fusion Sensor for an Assist System or Low Speed in Traffic Congestion Using Millimeter-Wave and an Image Recognition Sensor, SAE Technical Paper Series, 2001-01-0880, 2001, pp. 1-5.

Y. Fang, I. Masaki, B. Horn, Distance Range Based Segmentation in Intelligent Transportation Systems; Fusion of Radar and Binocular Stereo, pp. 171-176.

"Technology to Integrate a Vehicle-Mounted Camera and Image Processing Unit", Yoshiyuki Fukii, Hideki Tsukaoka, Jun. 2001, pp. 14-17.

"Obstacle Detection for Road Vehicles", Jorg Schutte.

"Use of Video Technology to Improve Automotive Safety Becomes More Feasible with Blackfin Processors", Source(s): http://www.analog.com/library/analogDialogue/archives/38-03/auto_safety.html.

Leeuweb et al., Vehicle Detection with a Mobile Camera, IEEE Robotics and Automation Magazine, Mar. 2005, pp. 37-43.

Sotelo et al., Road Vehicle Recognition in Monocular Images, IEEE ISIE Jun. 20-23, 2005, pp. 1471-1476.

Dagen et al., Forward Collision Warning with a Single Camera, IEEE Intelligent Vehicles Symposium, Jun. 14-17, 2004, pp. 37-42.

Stein et al., Vision-based ACC with a single camera: bounds on range and range rate accuracy, IEEE Intelligent Vehicles Symposium 2003, Jun. 9-11, 2003, pp. 120-125.

Mori et al. Shadow and Rhythem as Sign patterns of Obstacle Detection, 1993, IEEE International Symposium on Industrial Electronics, Conference Proceedings ISIE '93, pp. 271-277.

U.S. Patent and Trademark Office Action and U.S. Appl. No. 11/195,427, Dated Dec. 31, 2008.

U.S. Patent and Trademark Office Notice of Allowance, U.S. Appl. No. 11/049,502, Dated Nov. 13, 2008.

U.S. Patent and Trademark Final Office Action, U.S. Appl. No. 10/836,501, Dated Dec. 23, 2008.

German Office Action Date Stamped Jan. 19, 2009.

U.S. Appl. No. 11/195,427 Final Office Action Dated Jun. 16, 2009.

* cited by examiner

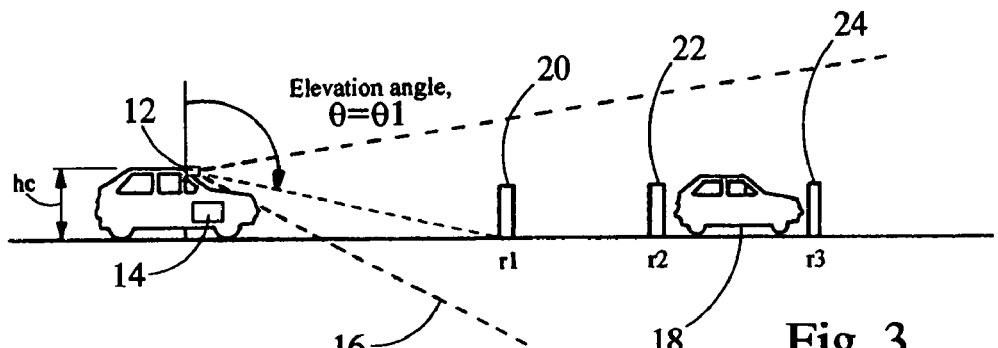
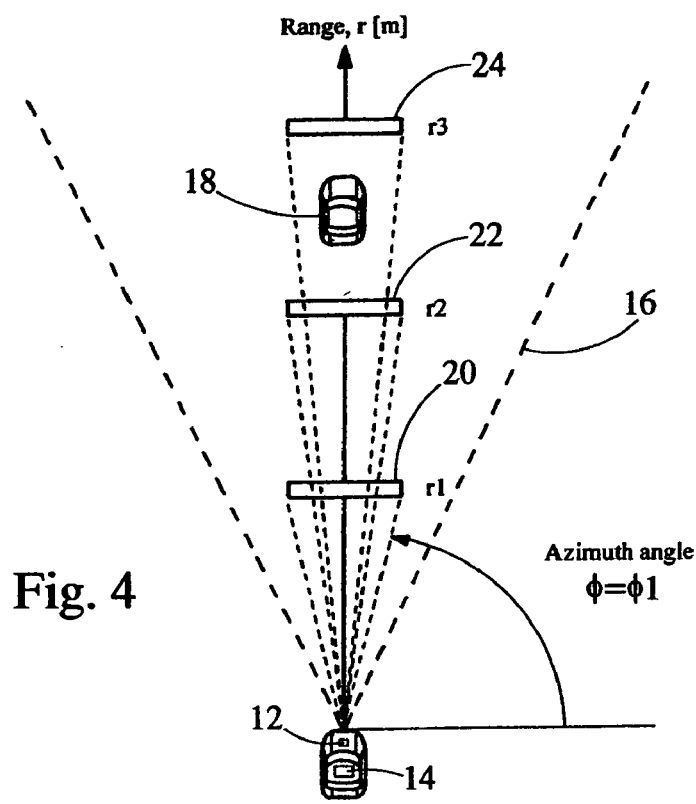
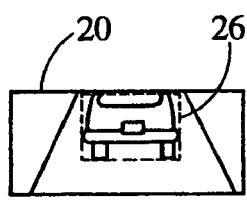 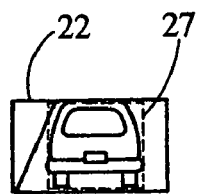 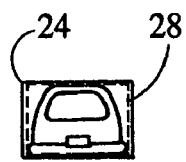
Fig. 5A             Fig. 5B             Fig. 5C R[m]=21 W-HEI[m]=2.2~0 W-LAT[m]=-0.7~3.4, C-ANG[DEG]=86.3, # OF SEG=18

OBJECT: R[m]=21, C-ANG[DEG]=86.3

SIZE: 42 X74, AREA: 18-42, 9-43

RANGE[m]=21, LAT[m]=-0.66 X 3.44, HEIGHT[m]=2.21 X -0.04

SYSTEM AND METHOD FOR RANGE MEASUREMENT OF A PRECEDING VEHICLE

BACKGROUND

1. Field of the Invention

The present invention generally relates to a system in a vehicle and method for range and lateral position measurement of a preceding vehicle on the road.

2. Description of Related Art

Radar and stereo camera systems for adaptive cruise control (ACC), have been already introduced into the market. Recently, radar has been applied to pre-crash safety system, collision avoidance and low speed follower (LSF) systems. Typically, the range and lateral position measurement of a preceding vehicle is accomplished utilizing radar and/or stereo camera systems. Radar systems can provide a very accurate range. However, millimeter wave type radar systems such as 77 GHz systems are typically quite expensive. Laser radar is low cost, but requires mechanical scanning. Further, radar, while good for range determination is generally, not well suited to identify the object and give an accurate lateral position.

Stereo camera systems can determine the range and identify the lateral position of an object. However, these systems are typically difficult to maintain the accuracy due to the accurate alignment required between the two cameras. They are also expensive requiring two image processors, twice as many image processors as a single camera system.

Further, both conventional camera and radar systems can be easily confused by multiple objects in an image. For example, multiple vehicles in adjacent lanes and roadside objects can be easily interpreted as a preceding vehicle in the same lane as the vehicle carrying the system. In addition, brightness variation in the background of the image, like the shadows of vehicles and roadside objects, can also increase the difficulty for these systems to identify the vehicle.

In view of the above, it can be seen that conventional ACC or LSF systems may have difficulty identifying vehicles due to a complex background environment. Further, it is apparent that there exists a need for an improved system and method for identifying and measuring the range and lateral position of the preceding vehicle with low cost.

SUMMARY

In satisfying the above need, as well as, overcoming the enumerated drawbacks and other limitations of the related art, the present invention provides a system for determining range and lateral position of a vehicle. The primary components of the system include a camera and a processor. The camera is configured to view a region of interest containing a preceding vehicle and to generate an electrical image of the region. The processor is in electrical communication with the camera to receive the electrical image.

As noted above, the electrical image includes many characteristics that make preceding vehicles difficult to identify. Therefore, the processor is configured to store a template, such as a template edge-enhanced image, of the preceding vehicle in a previous image. The template may be, preferably, identified using the range window algorithm (RWA) described herein, although other methods may be used. The template is then used to perform a pattern matching analysis, such as a cross correlation, on the electrical image to identify the range and lateral position of the preceding vehicle. Accordingly, the processor analyzes a portion of the electrical image corresponding to the last known location of the preceding vehicle and calculates a relationship to describe the range and lateral position of the preceding vehicle.

To initially identify objects in the electrical image, the processor investigates a series of windows within the image, each window corresponding to a fixed physical size at a different target range. The series of windows are called the range-windows. Accordingly, each window's size in the image is inversely proportional to the range of the window. The processor evaluates characteristics of the electrical image within each window to identify the preceding vehicle. For example, the size of the vehicle is compared to the size of each window to create a size ratio. The characteristics of the electrical image that are evaluated by the processor include the width and height of edge segments in the edge-enhanced image, as well as, the height, width, and location of objects constructed from a pair of edge segments. To analyze the objects, the width of the object is determined and a vehicle model is selected for the object from several models corresponding to various vehicle types, such as a motorcycle, sedan, bus, etc. The model provides the object a score on the basis of the characteristics of the corresponding vehicles. The scoring of the object characteristics is performed according to the vehicle model selected. And sometimes the pixel value deviation in the object area from the expected road pixel value based on the calculated relationship is also used for the scoring. The resultant score indicates the likelihood that the object is a target vehicle on the road. The object with the highest score becomes a target and the range of the window corresponding to the object will be the estimated range of the preceding vehicle. The analysis described above is referred to herein as range-window analysis.

In order to complement the range-window analysis, a pattern matching analysis is also performed. A template image is stored based on the range window algorithm. The template may be used in subsequent images to perform a pattern matching, such as a cross correlation. The results of the cross correlation may be combined with or substituted for the results of the range window algorithm to provide more robust range and lateral position measurements of the preceding vehicle. The analysis described above is referred to herein as pattern matching analysis. The combination of the pattern matching analysis and the range-window analysis provides a system with improved object recognition capability.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 3 is a schematic illustration of the system illustrating the calculation of the upper and lower edge of the windows in accordance with the present invention;

FIG. 4 is a schematic illustration of the system illustrating the calculation of the left and right edge of the windows, in accordance with the present invention;

FIG. 5A is a view of the electronic image, with only the image information in the first window extracted;

FIG. 5B is a view of the electronic image, with only the image information in the second window extracted;

FIG. 5C is a view of the electronic image, with only the image information in the third window extracted;

DETAILED DESCRIPTION

Figure 1:
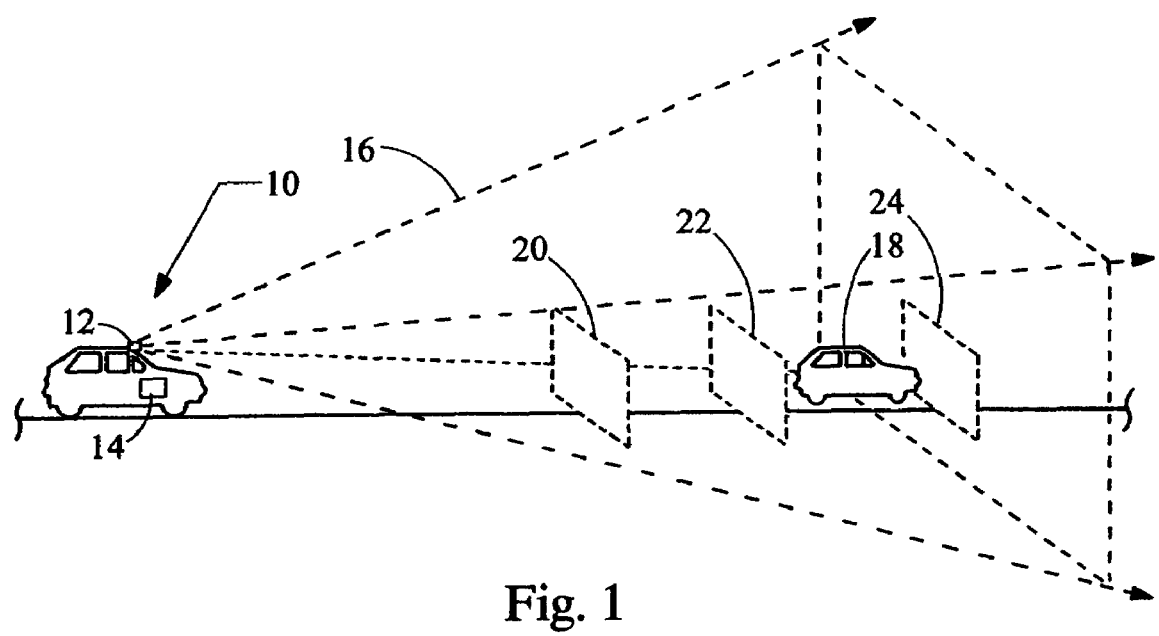
FIG. 1 is a schematic illustration of a system for range and lateral position measurement of a preceding vehicle, embodying the principles of the present invention.

Referring now to FIG. 1, a system embodying the principles of the present invention is illustrated therein and designated at 10. As its primary components, the system 10 includes a single camera 12 and a processor 14. The camera 12 is located so as to be able to collect an optical image of a region of interest 16 including a vehicle 18. One such location is in the housing of the rearview mirror. The optical image received by the camera 12, is converted to an electrical image that is provided to the processor 14.

The electrical image includes many characteristics that make preceding vehicles difficult to identify. Multiple techniques may be employed to identify the preceding vehicle. With the system and method of the present invention the processor 14 is configured to store a template, such as a portion of edge-enhanced image, of the preceding vehicle in a previous image. The template may be, preferably, identified using a range window algorithm as described herein, although other methods may be used. The template is then used to perform a pattern matching analysis, such as a cross correlation, on the electrical image to identify the range and lateral position of the preceding vehicle. Accordingly, the processor analyzes a portion of the electrical image corresponding to a previous position of the preceding vehicle and calculates the position and range of the preceding vehicle using a pattern matching algorithm. The value is used to calculate an overall score indicating the likelihood a vehicle is present at the identified location, which is expected near the previous position.

To filter out unwanted distractions in the electronic image and aid in determining the range of the vehicle 18, the processor 14 calculates the position of multiple windows 20, 22, 24 within the region of interest 16. The windows 20, 22, 24 are defined at varying target ranges from the camera 12. The size of the windows 20, 22, 24 are a predetermined physical size (about 4×2 m as shown) and may correspond to the size of a typical lane width and height of a vehicle. To provide increased resolution, the windows 20, 22, 24 may be spaced closer together and/or the number of windows is increased. Although the system 10, as shown, is configured to track a vehicle 18 preceding the system 10, it is fully contemplated that the camera 12 could be directed to the side or rear to track a vehicle 18 that may be approaching from other directions.

Figure 2:
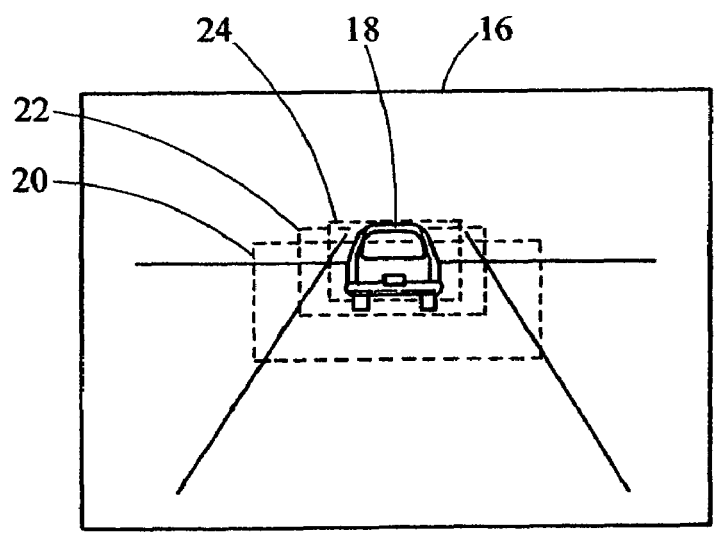
FIG. 2 is a schematic illustration of an electronic image from the perspective of the camera in FIG. 1.

Now referring to FIG. 2, an electronic image of the region of interest 16 as viewed by the camera 12 is represented therein. The windows 20, 22, 24 are projected into their corresponding size and location according to the perspective of the camera 12. The vehicle 18 is located between windows 22 and 24, accordingly, the size of the vehicle 18 corresponds much more closely to the height and width of windows 22 and 24 than window 20. As can be seen from FIG. 1, although the size and width of the windows are physically constant at each target range, the window sizes appear to vary from the perspective of the camera 12. Similarly, the height and width of the preceding vehicle 18 will appear to vary at each target range. The perspective of the camera 12 will also affect the apparent size and location of the preceding vehicle 18 within the electrical image based on the elevation angle and the azimuth angle of the camera 12. The processor 14 uses the location and size of each of the windows 20, 22, 24 to evaluate characteristics of the electrical image and determine a score indicating the probability the that vehicle 18 is at the target range associated with a particular window.

Now referring to FIG. 3, a side view of the system 10 is provided illustrating the use of the elevation angle in calculating the height and position of the window 20 within the electrical image. The elevation angle is the angle between the optical axis of the camera 12 and the surface of the road. The lower edge of window 20 is calculated based on Equation (1).

$$\Theta_1 = \arctan(-r1/hc) \qquad (1)$$

Where hc is the height of the camera 12 from the road surface, r1 is the horizontal range of window 20 from the camera 12, and the module of arctan is $[0, \pi]$.

Similarly, the upper edge of the first window is calculated based on Equation (2).

$$\Theta_{1h} = \arctan(r1/(hw-hc)) \qquad (2)$$

Where hw is the height of the window, hc is the height of the camera 12 from the road surface and r1 is the range of window

20 from the camera 12. The difference, $\Delta\Theta_1 = \Theta_1 - \Theta_{1h}$, corresponds to the height of the window in the electronic image.

Now referring to FIG. 4, the horizontal position of the window in the electronic image corresponds to the azimuth angle. The azimuth angle is the angle across the width of the preceding vehicle from the perspective of the camera 12. The right edge of the range window 20 is calculated according to Equation (3).

$$\phi_1 = \arctan(-\text{width}\_w/(2*r1)) + (\pi/2) \quad (4)$$

Similarly, the left edge of the range window 20 is calculated according to Equation (4).

$$\phi_{1h} = \arctan(\text{width}\_w/(2*r1)) + (\pi/2) \quad (4)$$

Where width_w is the distance from the center of the window 20 to the horizontal edges, r1 is the horizontal range of the window 20 from the camera 12, and the module of arctan is $[-\pi/2, \pi/2]$. The window positions for the additional windows 22, 24 are calculated according to Equations (1)-(4), substituting their respective target ranges for r1.

Now referring to FIG. 5A, the electronic image is shown relative to window 20. Notice the width of the object 26 is about 30% of the width of the window 20. If the window width is set at a width of 4 m, about twice the expected width of the vehicle 18, the estimated width of the object 26 at a distance of r1 would equal 4×0.3=1.2 m. Therefore, the likelihood that the object 26 is the vehicle 18 at range r1 is low. In addition, the processor 14 evaluates vertical offset and object height criteria. For example, the distance of the object 26 from the bottom of the processing window 20 is used in determining likelihood that the object 26 is at the target range. Assuming a flat road, if the object 26 were at the range r1, the lowest position of the object 26 would appear at the bottom of the window 20 corresponding to being in contact with the road at the target range. However, the object 26 in FIG. 5A, appears to float above the road, thereby decreasing the likelihood it is located at the target range. Further, the extracted object 26 should cover a height of 0.5 m or 1.2 m. The processor 14 will detect an object including the height of 0.5 m if the object is a sedan or 1.2 m if the object is a bus or large truck. The closer the height of the object 26 is to the expected height the more probable the object 26 is the vehicle 18 and the more probable it is located at the target range r1. The vertical offset, described above, may also affect the height of the object 26, as the top of the object, in FIG. 5A, is chopped off by the edge of the window 20. Therefore, the object 26 appears shorter than expected, again lowering the likelihood the object is the vehicle 18 at the range r1.

Now referring to FIG. 5B, the electronic image is shown relative to window 22. The width of the object 27 is about 45% of the window 22. Therefore, the estimated width of the object 27 at range r2 is equal to 4×0.45=1.8 m much closer to the expected size of the vehicle 18. In this image, the object 27 is only slightly offset from the bottom of the window 22, and the entire height of the object 27 is still included in the window 22.

Now referring to FIG. 5C, the electronic image is shown relative to window 24. The width of the object 28 is about 80% of the width of the window 24. Accordingly, the estimated width of the object 28 at range r3 is equal to 4×0.08=3.2 m. Therefore, the object width is significantly larger than the expected width of vehicle 18, usually about 1.75 m. Based on the object width, the processor 14 can make a determination that object 27 most probably corresponds to vehicle 18 and r2 is the most probable range. The range accuracy of the system 10 can be increased by using a finer pitch of target range for each window. Using a finer pitch between windows is especially useful as the vehicle 18 is closer to the camera 12, due to the increased risk of collision. Alternatively, the ratio between the estimated width and expected width is used to determine the most probable range.

In order to enhance the range-window analysis, a road surface analysis is added. The electrical image includes many characteristics that make preceding vehicles difficult to identify. Therefore, the processor 14 is configured to analyze a portion of the electrical image corresponding to the road surface and calculate an equation to describe the change in pixel value of the road along the longitudinal direction within the image. For example, the equation may be calculated using a regression algorithm, such as a quadratic regression. The processor 14 is also configured to compare the pixel values at a location in the image where a vehicle may be present to the expected pixel value of the road, where the expected pixel value of the road is calculated based on the equation. If the similarity between the pixel and expected values is high, the probability that an object exists at the location is low. Accordingly, the resulting score is low. If the similarity is low, the score is high. The results of the comparison are combined with the results of the range-window algorithm to generate a score that indicates the likelihood a vehicle is present at the identified location.

Figure 6:
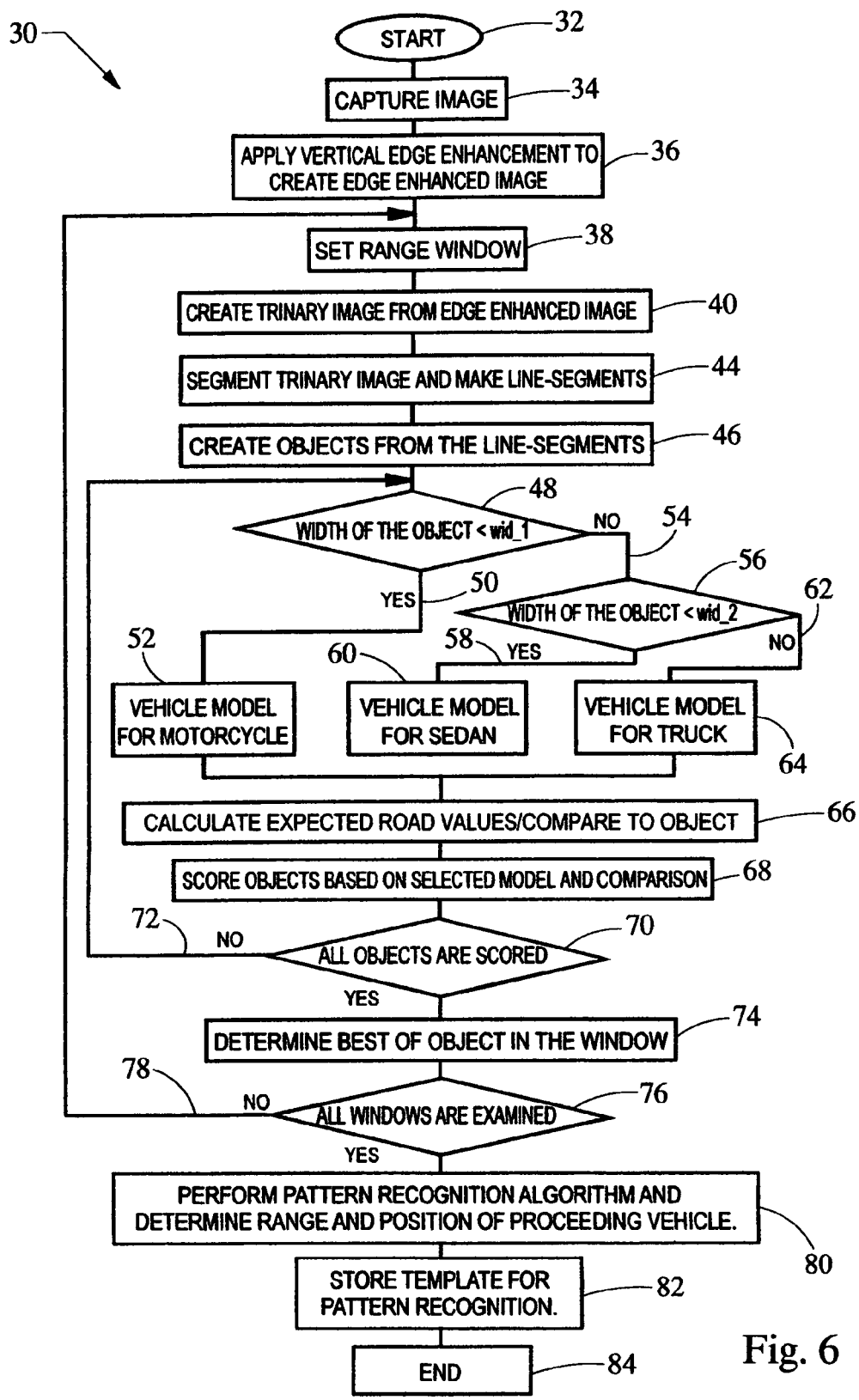
FIG. 6 is a flowchart illustrating the algorithm executed by the system to determine the range of the preceding vehicle.

Now referring to FIG. 6, a method for processing an image according to the present invention is provided at reference numeral 30. Block 32 denotes the start of the method. In block 34, an image is captured by the camera 12 and transferred to the processor 14. The processor 14 applies vertical edge enhancement to create an edge enhanced image as denoted by block 36. In block 38, the processor 14 sets a range window to limit the region analyzed for that specific range, thereby eliminating potentially confusing edge information. A trinary image, in which the negative edge, positive edge and the others are assigned "−1", "+1", and "0", is created within the range window from the edge enhanced image as denoted by block 40. In block 44, the trinary image is segmented to sort pixels of the same value and a similar location into groups called line-segments. Two segments with different polarity are grouped together to form objects that correspond to a potential vehicle, as denoted in block 46.

In block 48, the width of an object is compared to a width threshold to select the model. If the width of the object is less than the width threshold, the algorithm follows line 50 to block 52 where a vehicle model corresponding to a motor cycle is selected. If the width of the object is not less than the first width threshold, the algorithm follows line 54 to block 56. In block 56, the width of the object is compared to a second width threshold. If the width of the object is less than the second width threshold, the algorithm follows line 58 and a vehicle model corresponding to a Sedan is selected, as denoted in block 60. However, if the width of the object is greater than the second width threshold, the algorithm follows line 62 to block 64 where a model corresponding to a truck is selected, as denoted in block 64.

In block 68, the processor then scores the objects based on the score of the selected model value comparison. In block 70, the processor 14 determines if all the objects for that range window have been scored. If all the objects have not been scored, the algorithm follows line 72 and the width of the next object is analyzed to select a vehicle model starting at block 48. If all the objects have been scored, the best object in the window is determined on the basis of the score. Then the processor determines if all the windows have been completed, as denoted by block 76. If all the windows have not been completed, the algorithm follows line 78 and the window is changed. After the window is changed, the algorithm follows line 78 and the next range window is set as denoted by block 38. If all the windows have been completed, the best object is selected from the best objects-in-window on the basis of the score. If the best score is below a first score threshold, the processor 14 is configured to perform a pattern matching algorithm on the trinary edge image using a previously stored template, such as a trinary edge template image. The edge template image may be cross correlated with the trinary edge image to determine a range and position of the preceding vehicle. The results of the pattern matching algorithm may be combined with the results of the range window analysis or used in place of the range window analysis to determine the range and position of the preceding vehicle depending on the correlation score and the best object score, as denoted in block 80. If the best object score is above a second threshold, the processor 14 is configured to store a template based on the range window algorithm. The template is, preferably, an edge image template, derived from a portion of the trinary edge image corresponding to the best score object identified by the range window analysis, as denoted in block 82.

Figure 7:
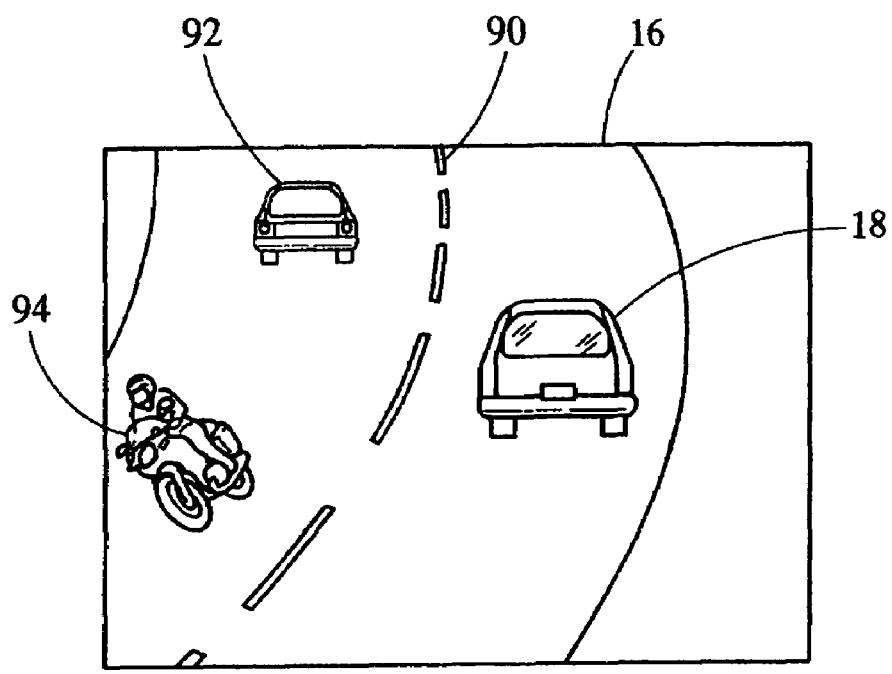
FIG. 7 is a view of an electronic image generated by the camera prior to processing.

Now referring to FIG. 7, a typical electronic image as seen by the camera 12 is provided and will be used to further describe the method implemented by the processor 14 to determine the range and lateral position of the vehicle 18. The electronic image includes additional features that could be confusing for the processor 14 such as the lane markings 90, an additional car 92, and a motorcycle 94.

Figure 8:
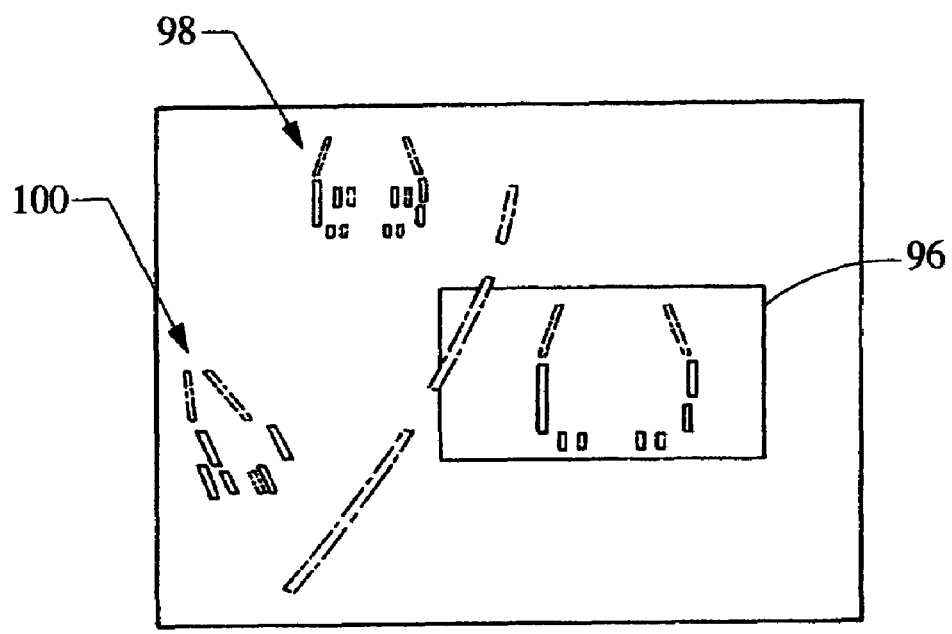
FIG. 8 is a view of the electronic image after a vertical edge enhancement algorithm has been applied to the electronic image.

FIG. 8 shows a vertically edge enhanced image. The electronic image is comprised of horizontal rows and vertical columns of picture elements (pixels). Each pixel contains a value corresponding to the brightness of the image at that row and column location. A typical edge enhancement algorithm as known in the art includes calculating the derivative of the brightness across the horizontal rows or vertical columns of the image. However, many other edge enhancement techniques are contemplated and may be readily used. In addition, the position and size of the window 96 is calculated for a given target range. Edge information located outside the window 96 is ignored. In this instance, much of the edge enhanced information from the car 98 and the motorcycle 100 can be eliminated.

Figure 9:
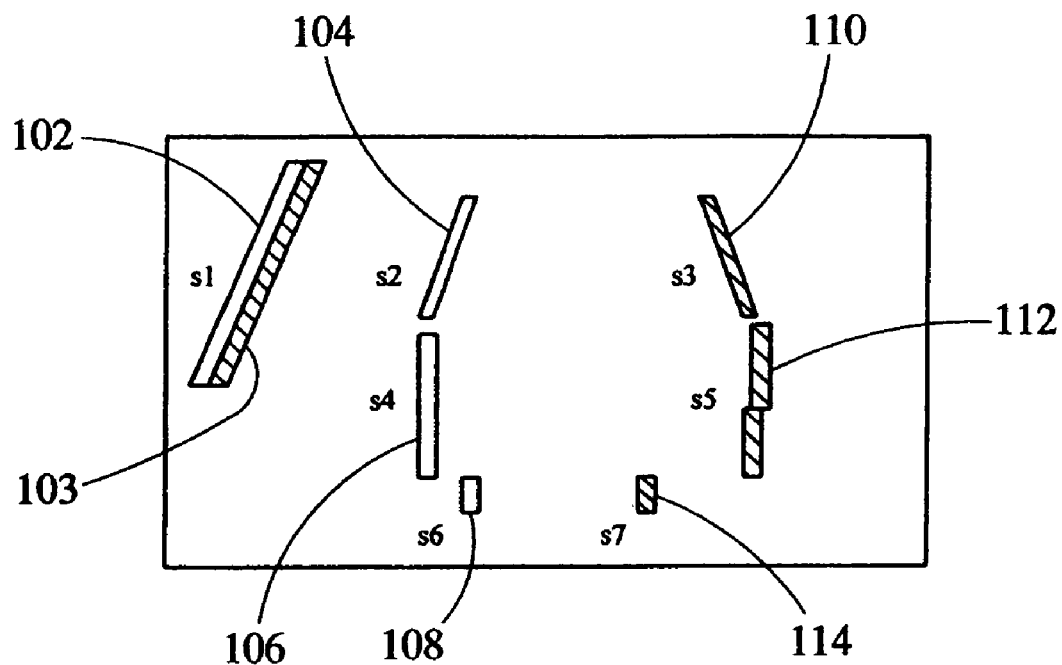
FIG. 9 is a view of the electronic image including line segments that are extracted from the edge enhanced image.

Now referring to FIG. 9, the edge enhanced image is then trinarized, meaning each of the pixels are set to a value of −1, +1, or 0. A typical method, as known in the field, for trinarizing the image includes taking the value of each pixel value and applying an upper and lower threshold value, where if the brightness of the pixel value is above the upper threshold value, the pixel value is set to 1. If the brightness of the pixel value is below the lower threshold value, the pixel value is set to −1. Otherwise, the pixel value is set to 0. This effectively separates the pixels into edge pixels with a bright to dark (negative) transition, edge pixels with a dark to bright (positive) transition, and non-edge pixels. Although, the above described method is fast and simple, other more complicated thresholding methods may be used including local area thresholding or other commonly used approaches. Next, the pixels are grouped based on their relative position to other pixels having the same value. Grouping of these pixels is called segmentation and each of the groups is referred to as a line-segment. Height, width and position information is stored for each line-segment.

Relating these segments back to the original image, Segment 102 represents the lane marking on the road. Segment 104 represents the upper portion of the left side of the vehicle. Segment 106 represents the lower left side of the vehicle. Segment 108 represents the left tire of the vehicle. Segment 110 represents the upper right side of the vehicle. Segment 112 represents the lower right side of the vehicle while segment 114 represents the right tire.

Figure 10:
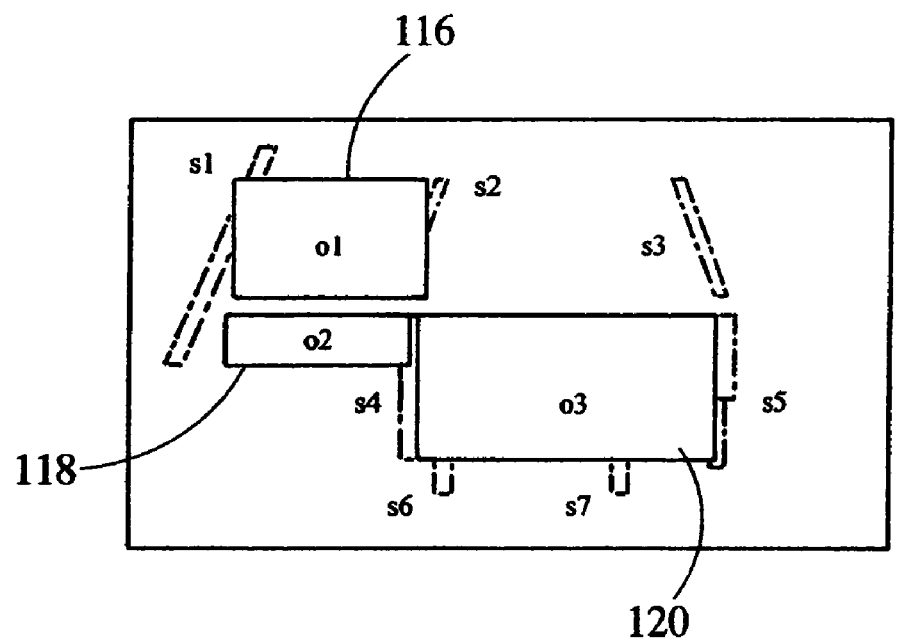
FIG. 10 is a view of the electronic image including objects constructed from the line segments illustrated in FIG. 8.

Now referring to FIG. 10, objects may be constructed from two segments. Typically, a positive segment would be paired with a negative segment. Segment 103 and segment 104 are combined to construct object 116. Segment 103 and segment 106 are combined to construct object 118. In segment 106 and segment 112 are combined to construct object 120.

The characteristics of each object will then be evaluated by the characteristics of a model vehicle. A model is selected for each object based on the width of the object. For example, if the object width is smaller than a first width threshold, a model corresponding to a motorcycle will be used to evaluate the object. If the object width is larger than the first width threshold but smaller than a second width threshold, a model corresponding to a Sedan is used. Alternatively, if the object width is greater than the second width threshold, the object is evaluated by a model corresponding to a large truck. While only three models are discussed here, a greater or smaller number of models may be used.

Each model will have different characteristics from the other models corresponding to the characteristics of a different type of vehicle. For instance, the vertical-lateral ratio in the Motorcycle model is high, but the vertical-lateral ratio in the Sedan model is low. These characteristics correspond to the actual vehicle, as the motorcycle has a small width and large height, but the sedan is opposite. The height of the object is quite large in Truck model but small in the Sedan model. The three models allow the algorithm to accurately assign a score to each of the objects.

The characteristics of the objects are compared with the characteristics the model. The closer the object characteristics meet the model characteristics the higher the score will be, and the more likely the object is a vehicle of the selected model type. Certain characteristics may be weighted or considered more important than other characteristics for determining if the object is a vehicle. Using three models enables more precise judgment than a single model, because the three types of vehicles are quite different in the size, height, shape and other criteria necessary for identifying the vehicle. These three models also contribute to an improvement in the range accuracy of the algorithm.

Each of the objects is then scored based on characteristics of the object, including the width of the object, the height of the object, the position of the object relative to the bottom edge of the window, the segment width, the segment height, and the comparison of the object region pixel values with the expected road pixel values. The above process is repeated for multiple windows with different target ranges.

Figure 11:
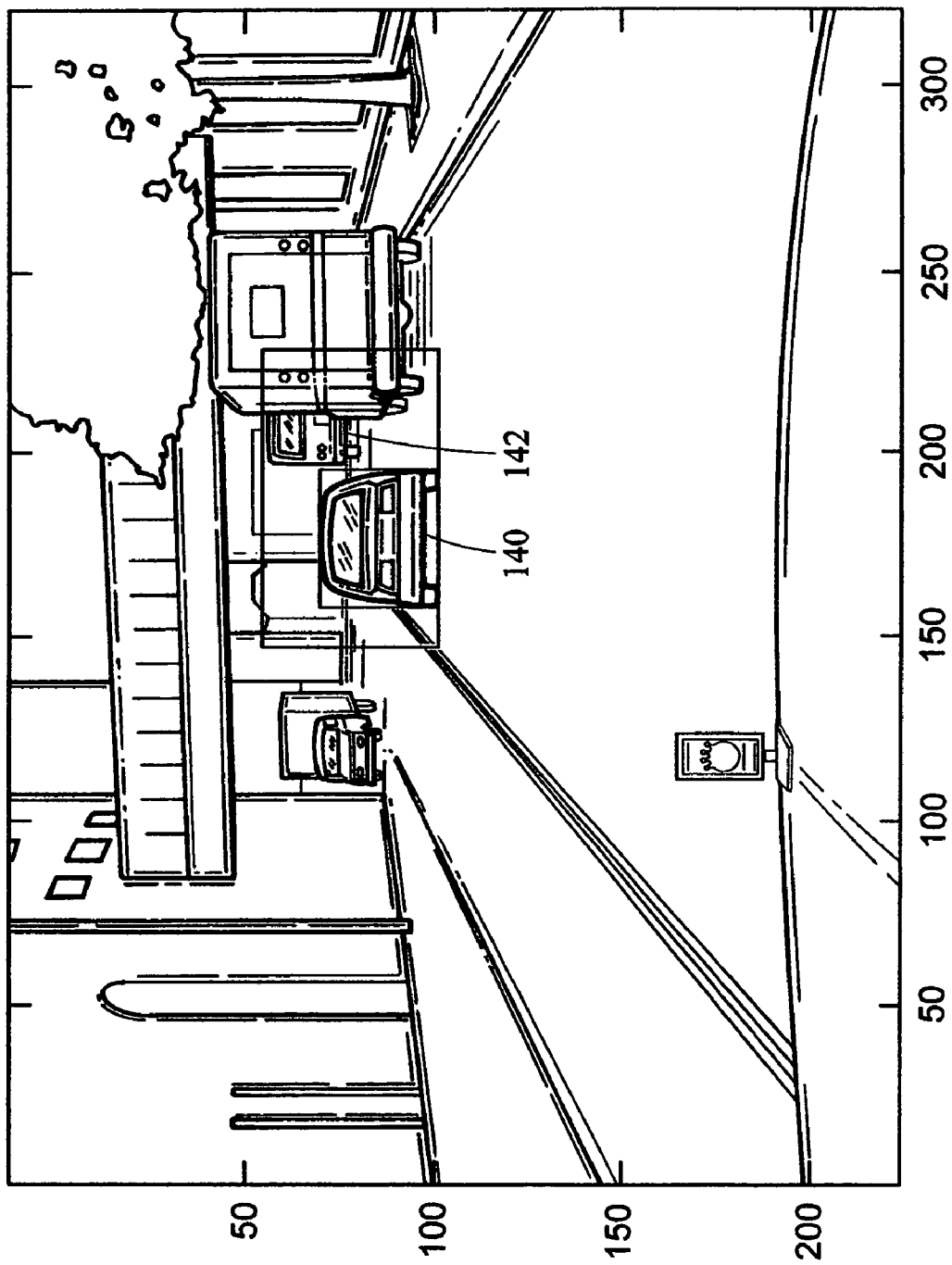
FIG. 11 is an image of a preceding vehicle at a time T1.
Figure 12:
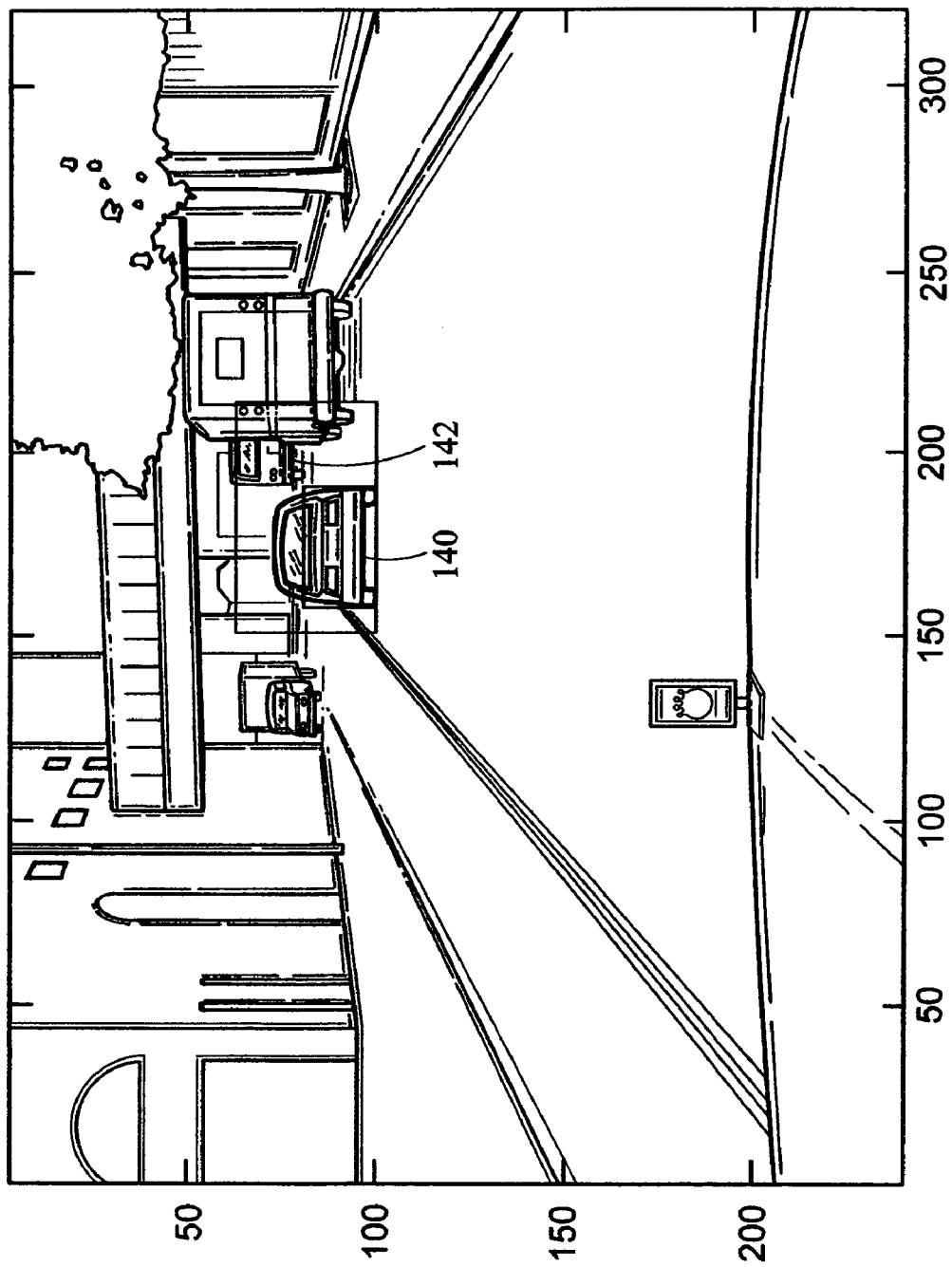
FIG. 12 is an image of the preceding vehicle at a time T2.
Figure 13:
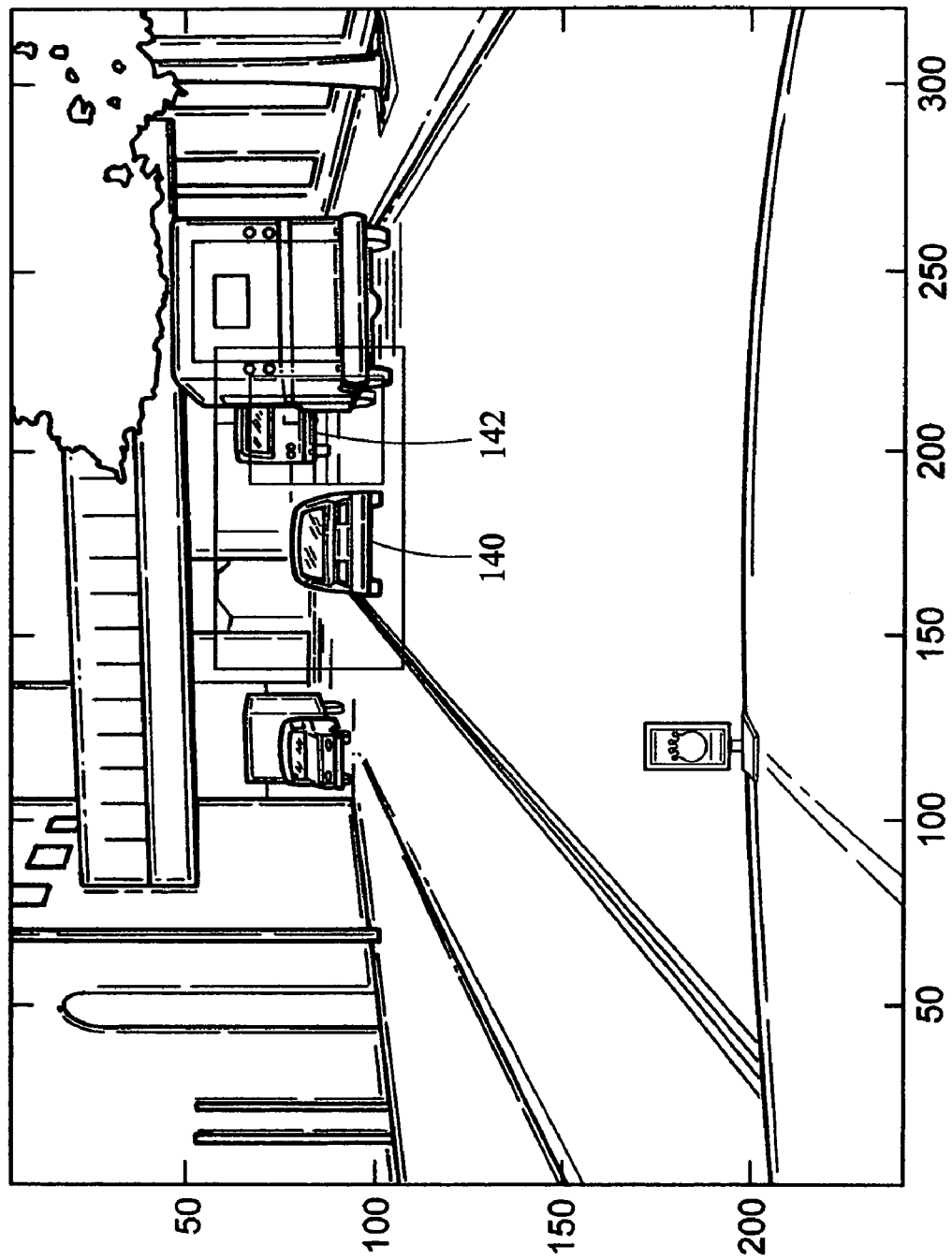
FIG. 13 is an image of the preceding vehicle at a time T3.

To complement the range-window analysis, the pattern matching analysis is also performed. While the range-window algorithm described above may provide excellent results for certain situations, the range-window algorithm may be confused by other image configurations. One such scenario is illustrated by FIGS. 11, 12 and 13. In FIG. 11, the preceding vehicle is denoted by reference numeral 140. The preceding vehicle 140 is some distance away from the camera and, therefore, generally blends in with the background scenery of the image. In particular, a parked vehicle 142 has a left-hand edge very close to the right-hand edge of the preceding vehicle 140. The image in FIG. 11 is taken at a time T1. In FIG. 12, the image was taken at a time T2 that is one half second later than the time T1. The preceding vehicle 140 has moved closer to the parked vehicle 142, however, the range-window algorithm in this instance is still able to detect the preceding vehicle 140. In FIG. 13, the image is taken at a time T3 that is one second after the original image taken at time T1. Again, the preceding vehicle 140 has moved closer to the parked vehicle 142 causing a blending of the edges of the two vehicles. Further, a shadow is cast on the left side of the vehicle 140 causing a break in the left edge. These situations reduce the object score within the range-window algorithm.

Figure 14:
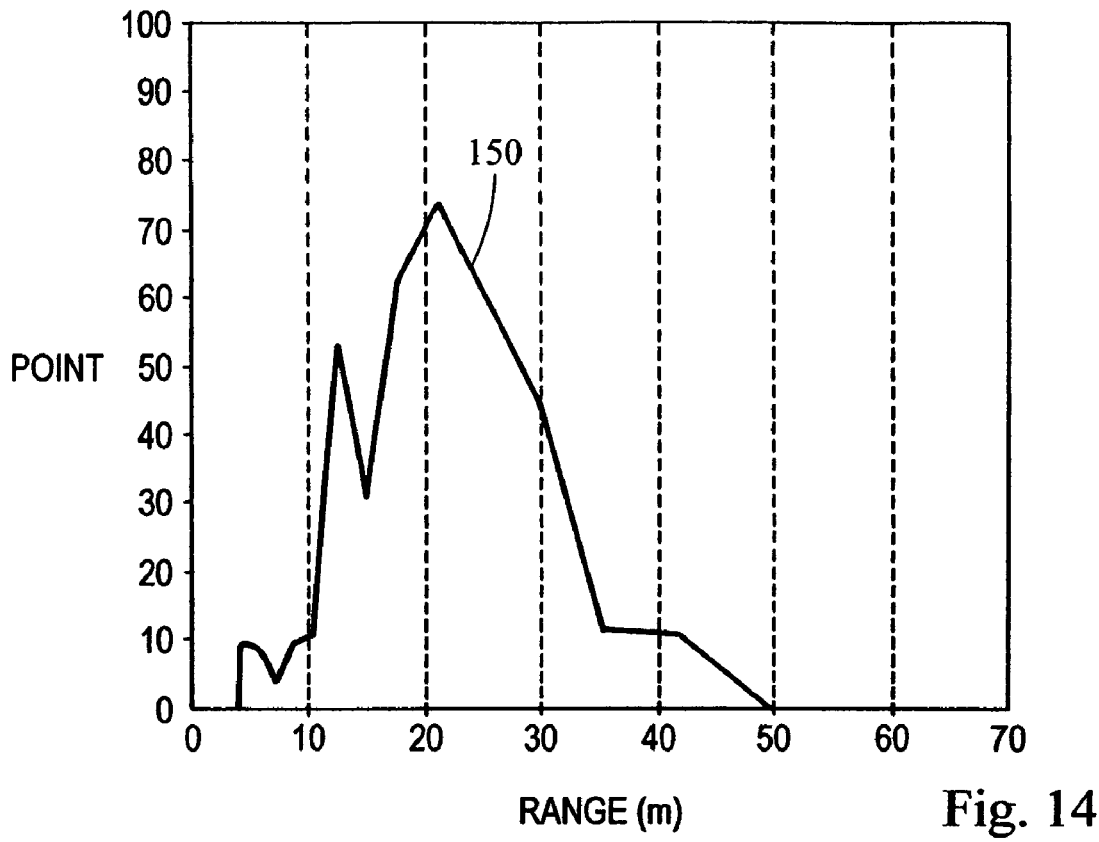
FIG. 14 is a graph illustrating the highest score of an object found at various ranges using the range window algorithm at T1.
Figure 15:
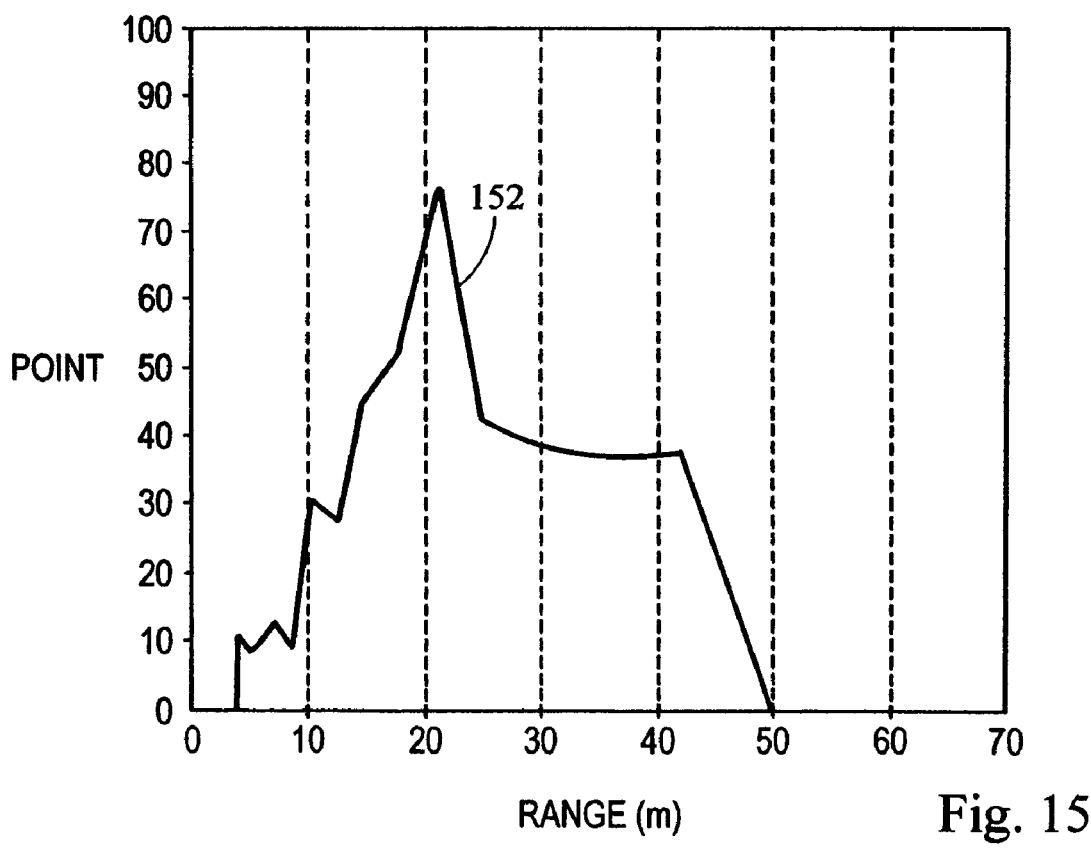
FIG. 15 is a graph illustrating the highest score of an object found at various ranges using the range window algorithm at T2.
Figure 16:
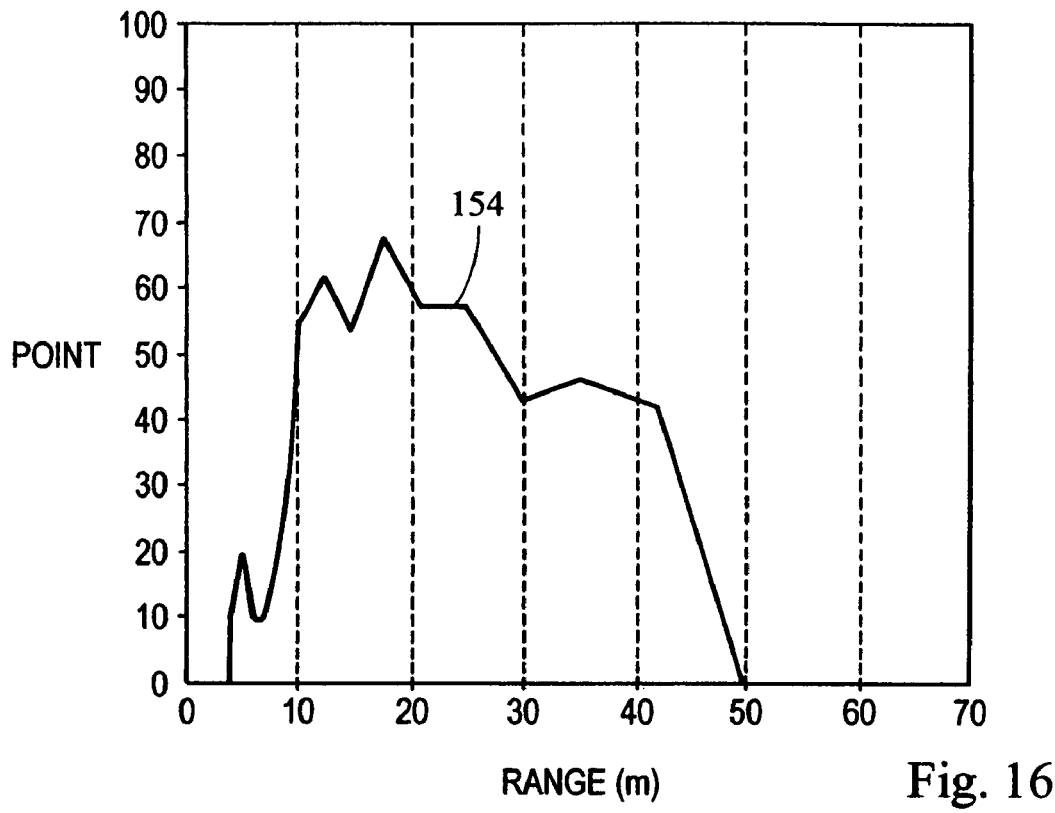
FIG. 16 is a graph illustrating the highest score of an object found at various ranges using the range window algorithm at T3.

The effect on the object score is further illustrated by the graphs provided in FIGS. 14, 15, and 16. These graphs provide the range-window algorithm score for the highest scored object within each range window. Accordingly, line 150, in FIG. 14, corresponds to the range-window scores for the image taken at T1 in FIG. 11. Line 152, in FIG. 15, corresponds to the highest object score for each range-window for the image taken at time T2 in FIG. 12. Similarly, line 154, in FIG. 16, corresponds to the object scores for each range-window in the image taken at time T3 in FIG. 13. However, with a proper template, a pattern matching algorithm can be used to distinguish the preceding vehicle 140 in FIG. 13. In general, pattern matching can be difficult because the need for the significant variations of templates based on vehicle size, shape and illumination conditions. Therefore, one template cannot be used to describe the wide variation of potential vehicles. However, if a vehicle has already been identified in the near past, for example by the range window algorithm, an appropriate template may be made of the vehicle from the near past image. Then, the template may subsequently used to find the vehicle in complex background scenery. As such, the range window algorithm may continuously update the template of the preceding vehicle 140 for use in subsequent images when the background information causes the results of the range window algorithm to fall below an acceptable level.

Figure 17:
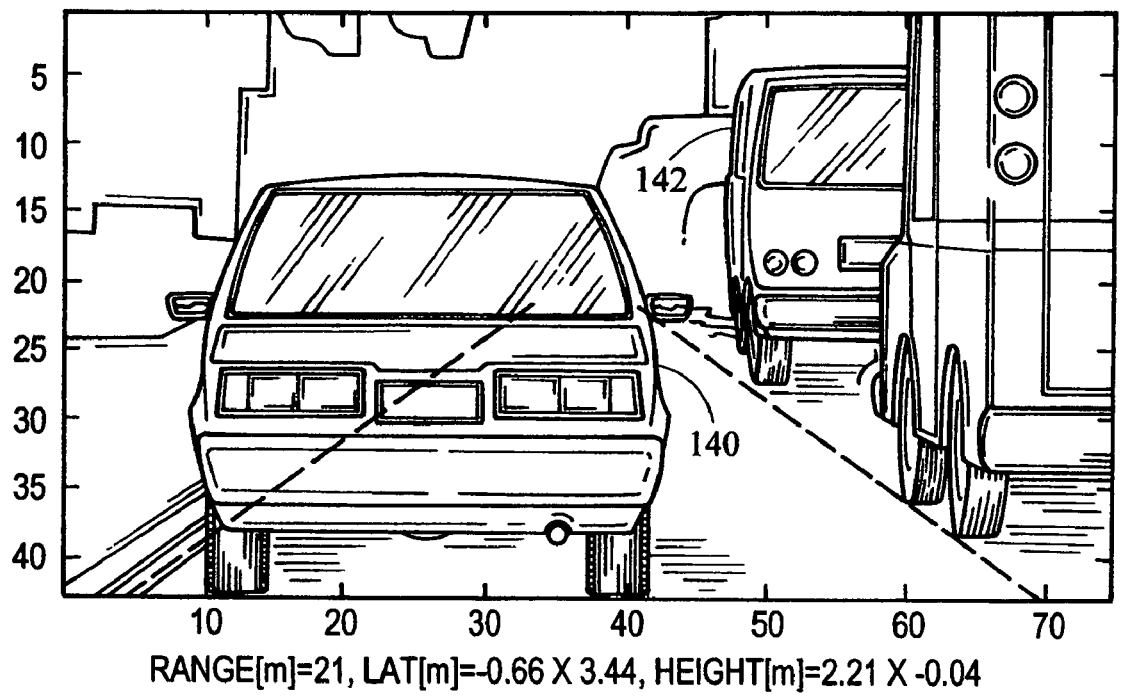
FIG. 17 is a windowed view of FIG. 11 at time T1.
Figure 18:
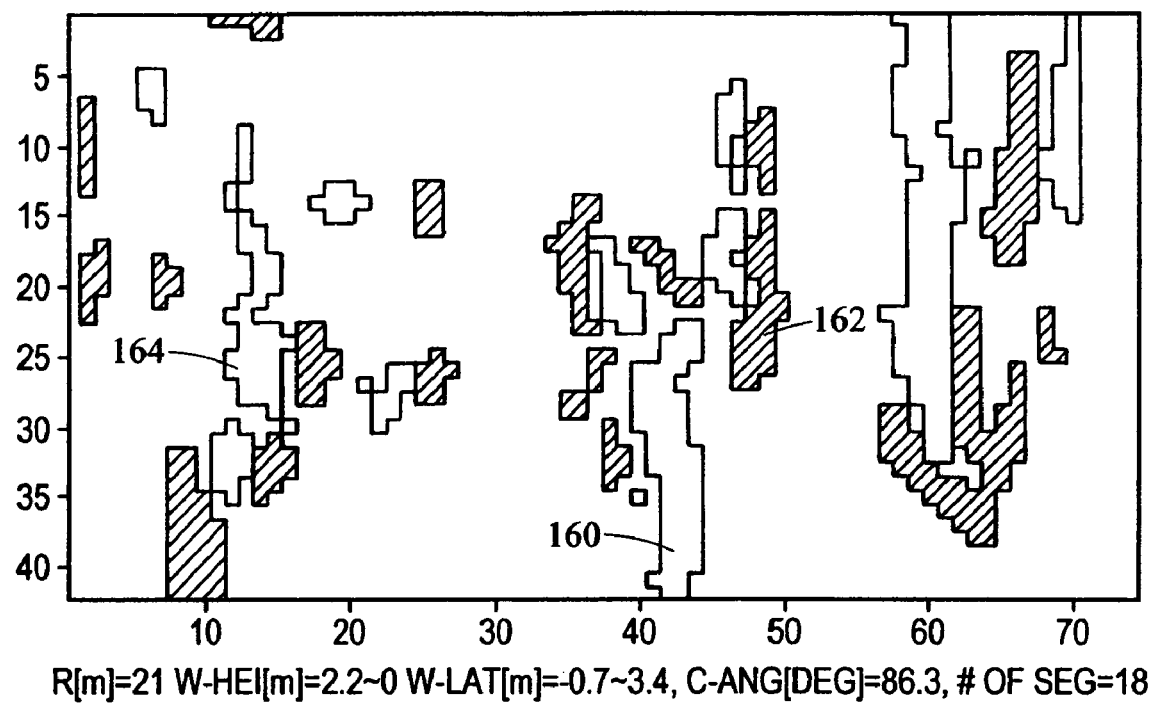
FIG. 18 is a trinary edge enhanced image of FIG. 17 at the time T1.
Figure 19:
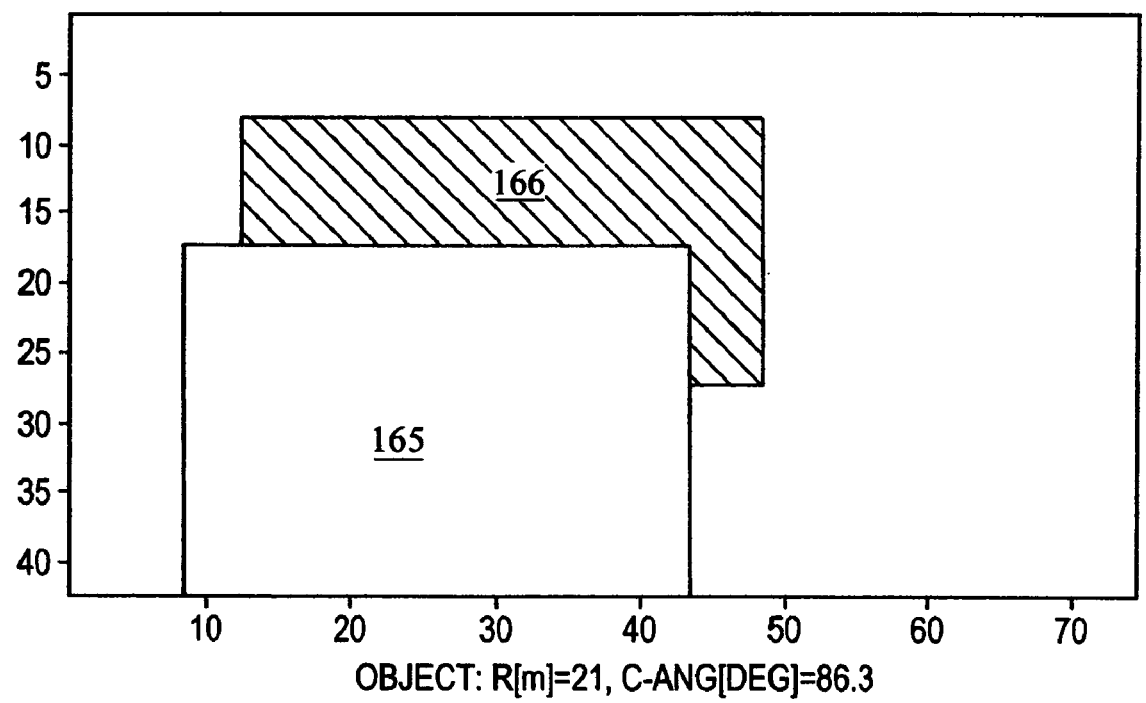
FIG. 19 is an image illustrating the objects found by the range window algorithm at T1.
Figure 20:
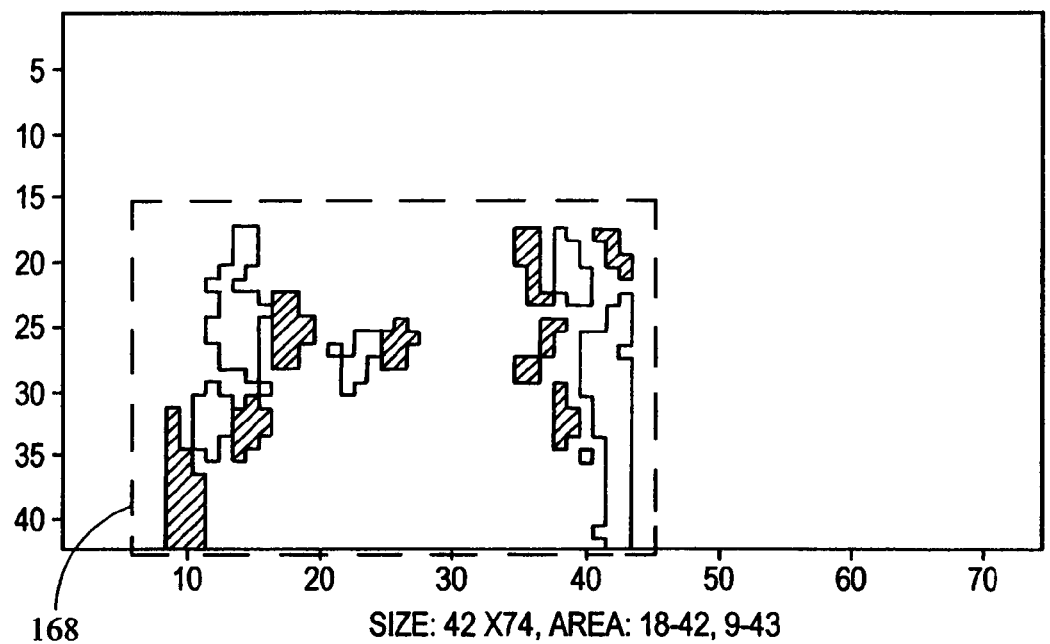
FIG. 20 is the template image derived from the trinary edge enhanced image in FIG. 18 using the highest score object as illustrated in FIG. 19 at time T1.

Now referring to FIG. 17, a windowed view of the preceding vehicle 140 at time T1 is provided. In the windowed view, the magnification is increased making it is easier to discern vehicle 140 and the parked vehicle 142. A corresponding edge enhanced image is derived from the gray scale image of FIG. 17 and is illustrated in FIG. 18. The edge enhanced image of FIG. 18 is a trinary edge image that has been used to highlight the vertical edges within the gray scale image. The right edge of the preceding vehicle 140 is labeled at reference numeral 160. Although situated closely to edge 160, the left edge 162 of the parked vehicle 142 can still be discerned and segmented independently from edge 160. Accordingly, objects may be constructed from the right edge 160 of the preceding vehicle 140 and the left edge 164 of the preceding vehicle 140 to construct an object 165 depicted in FIG. 19. In addition, the left edge 162 of the parked vehicle 142 may also be used to construct an object 166 with the left edge 164 of the preceding vehicle 140. However, for that particular range-window, the parameters of object 165 provide an overall higher score than object 166. Accordingly, the range window algorithm properly identifies the object 165 as the preceding vehicle 140. In addition, the region of object 165 may be used in conjunction with the trinary edge image of FIG. 18 to construct a template 168 shown in FIG. 20, the template 168 is a trinary edge template that is constructed using the edge information of the trinary image that is contained within the overlapping region of object 165.

Figure 21:
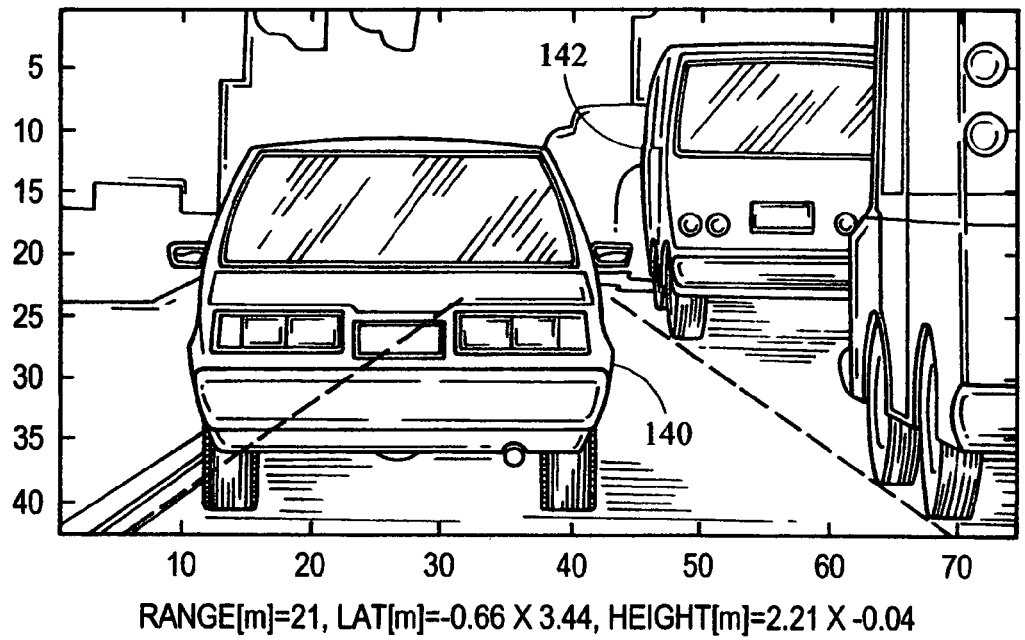
FIG. 21 is a windowed view of the preceding vehicle of FIG. 13 at T3.

Now referring to FIG. 21, a window view of the preceding vehicle 140 at time T3 is provided. At time T3, the preceding vehicle 140 has moved closer to the bridge and the parked vehicle 142. The trinary edge enhanced image derived from the gray scale image of FIG. 21 is provided in FIG. 22. The right edge of the vehicle 160 is still clear. But the shadow of the bridge on the left side of the vehicle degrades the left edge 164. Accordingly, the object corresponding to the vehicle 140 is created by the edge window algorithm as denoted by reference numerals 172 and a ghost object is also created by reference 170 in FIG. 23. The ghost object has a larger score than the true object 172.

Figure 22:
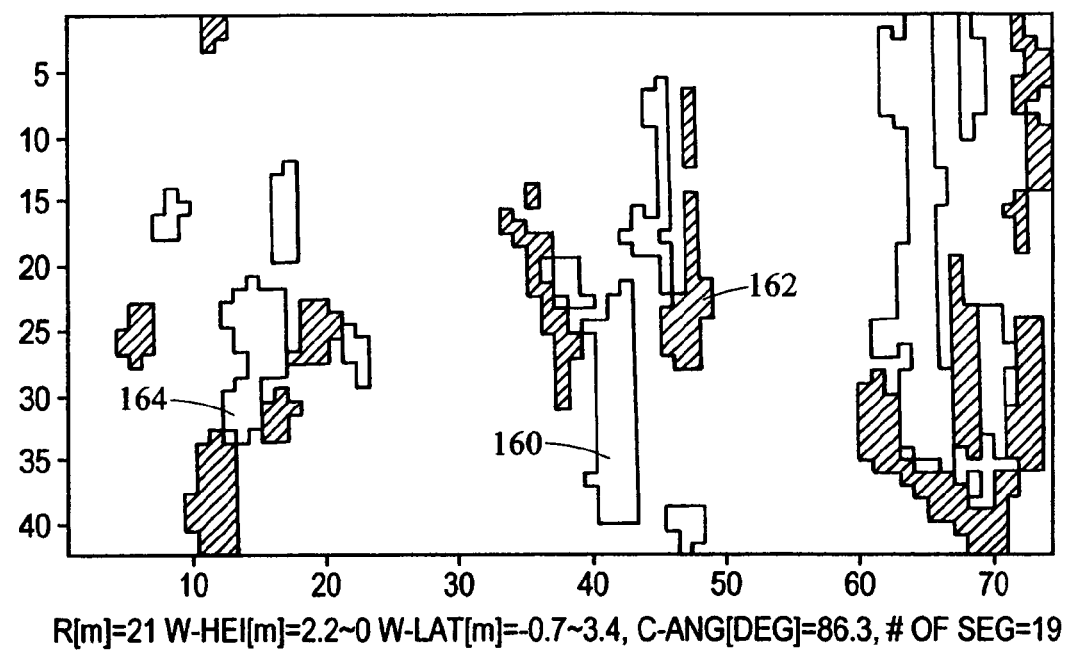
FIG. 22 is a trinary edge enhanced image derived from the windowed view in FIG. 21.
Figure 23:
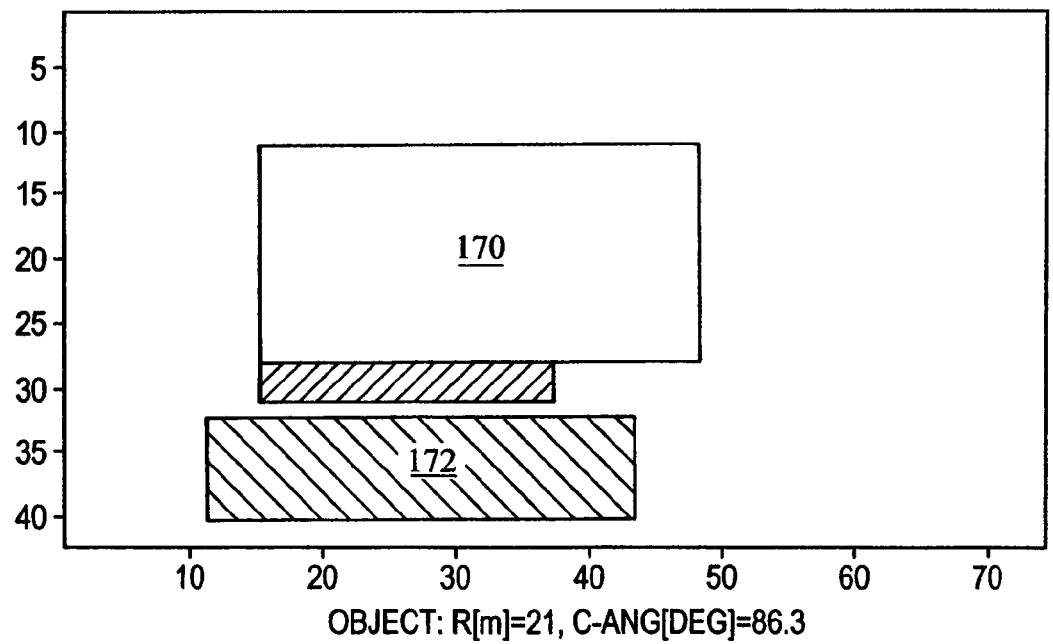
FIG. 23 illustrates the objects constructed by the range window algorithm from the trinary edge enhanced image of FIG. 22.
Figure 24A:
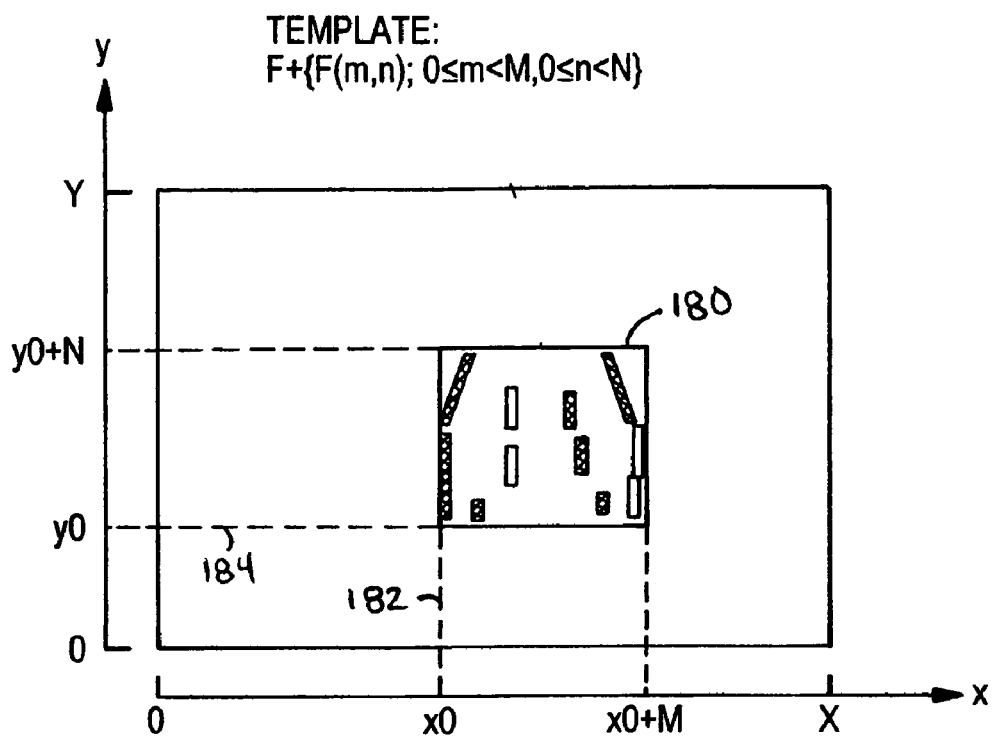
FIG. 24a is a an illustration of the template.
Figure 24B:
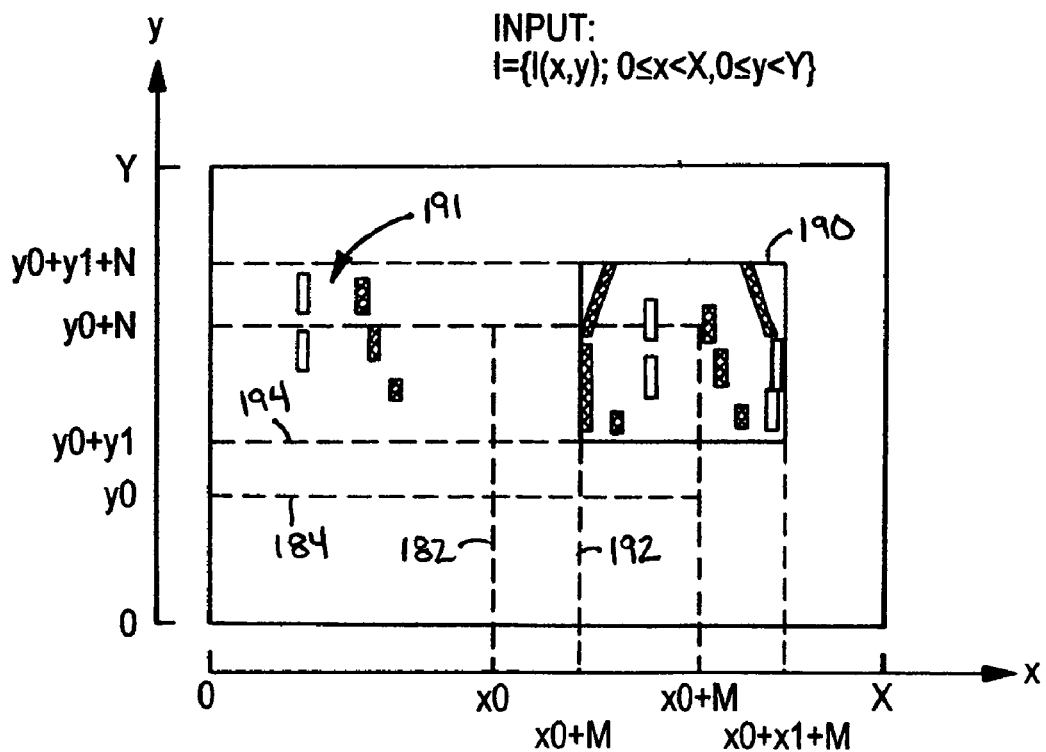
FIG. 24b is a an illustration of the input image and the cross correlation function.

However, a template 168 may be used by a pattern matching algorithm to identify the preceding vehicle 140 in the trinary image of FIG. 22. As such, the pattern matching algorithm performs a cross correlation function between the template 168 and the trinary edge image in FIG. 22. By using the cell positions shown in FIGS. 24a and b, the cross correlation function is calculated in accordance with equation 1.

$$C(x1, y1) = \sum_{0 \le m < M} \sum_{0 \le n < N} F(m, n) I(m + x0 + x1, n + y0 + y1) \quad (1)$$

where C, F, I, M, N, x0, y0, x1 and y1 are the cross correlation function, the template 180, the input image 190, the horizontal and vertical sizes of the template, the x- and y-positions 182, 184 of the vehicle in the original image, the horizontal- and vertical-shifts, respectively. The vehicle shift in the input image 190 from the original image will be limited by the speed of the vehicle. Accordingly, a maximum shift in the vertical or horizontal direction may be calculated to reduced the processing of the cross correlation function. In addition, limiting the horizontal shift x1, the difference between 194 and 184, and the vertical shift y1, the difference between 192 and 182, will help avoid extraneous edge information 191 in the subsequent images. By using Eqs.(2) and (3), the normalized cross correlation function is given by Eq.(4).

$$P_F = \sum_m \sum_n F(m, n) F(m, n) \quad (2)$$

$$P_I(x1, y1) = \quad (3)$$
$$\sum_m \sum_n I(m + x0 + x1, n + y0 + y1) I(m + x0 + x1, n + y0 + y1)$$

$$C_n(x1, y1) = \frac{C(x1, y1)}{\sqrt{P_F P_I(x1, y1)}} \quad (4)$$

where $P_F$, $P_I$, $C_N$, x0 and y0 are the powers of the template and the subset of the input image, the normalized cross correlation function and the left and lower positions of the template in a original image, respectively.

Figure 25:
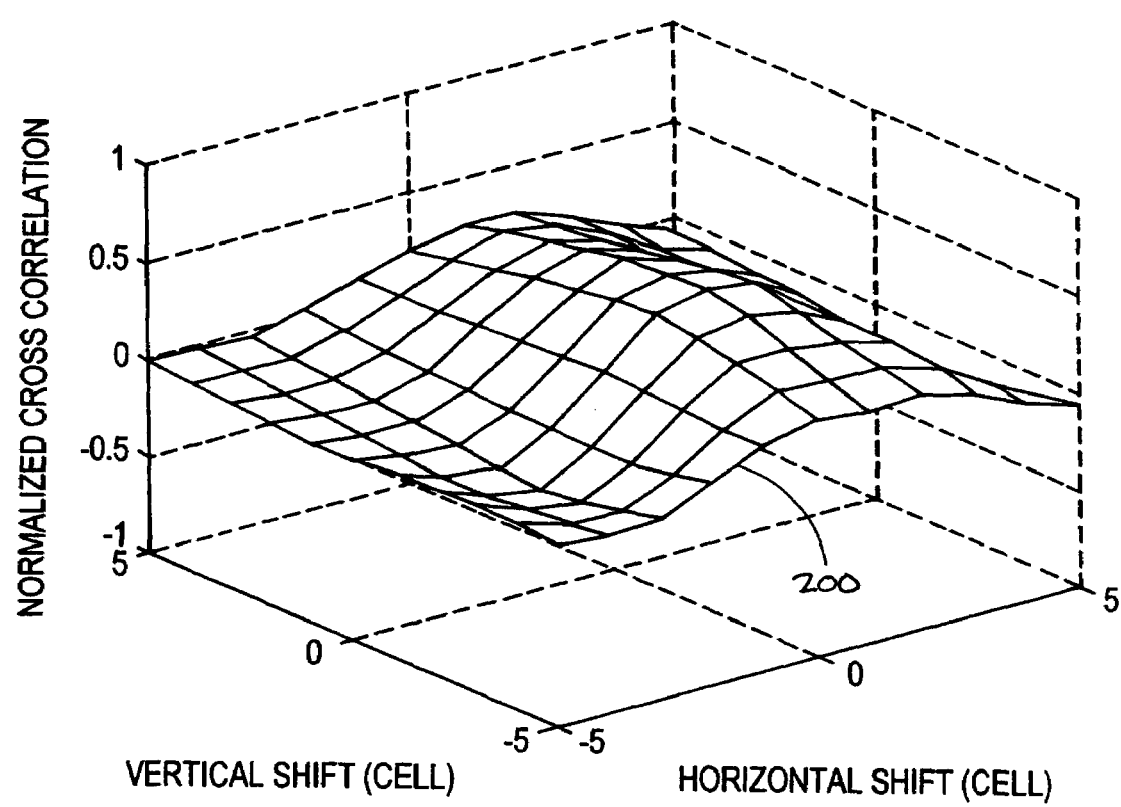
FIG. 25 is a three-dimensional graph illustrating the cross correlation of the template from FIG. 20 with the trinary image of FIG. 22.

The result cross correlation function is shown in FIG. 25 and denoted by surface 200. A sharp peak is obtained along the horizontal direction of the surface 200, but not in vertical direction. The highest position is at (x1=1, y1=0). The estimated object position (left and lower corner base) at T3 is moved from the position at T1 by (x1=1 and y1=0). Namely the position is shifted by 1 cell horizontally and by 0 cell vertically, respectively. This shift can provide the lateral position of the object at T3. If the cross correlation value at (x1=1, y1=0) is larger than a correlation threshold value, the object is identified as the preceding vehicle.

Over the time that the pattern matching algorithm is used, the vehicle may move closer or further away from the camera. Accordingly, the size of the edge pattern may change. For example, the vertical edges may be closer or further away from each other depending on how close the preceding vehicle is from the camera. Accordingly, the template may be warped and the cross correlation may be performed with a smaller template, the template at the original size, and a larger template to identify the preceding vehicle.

Figure 26A:
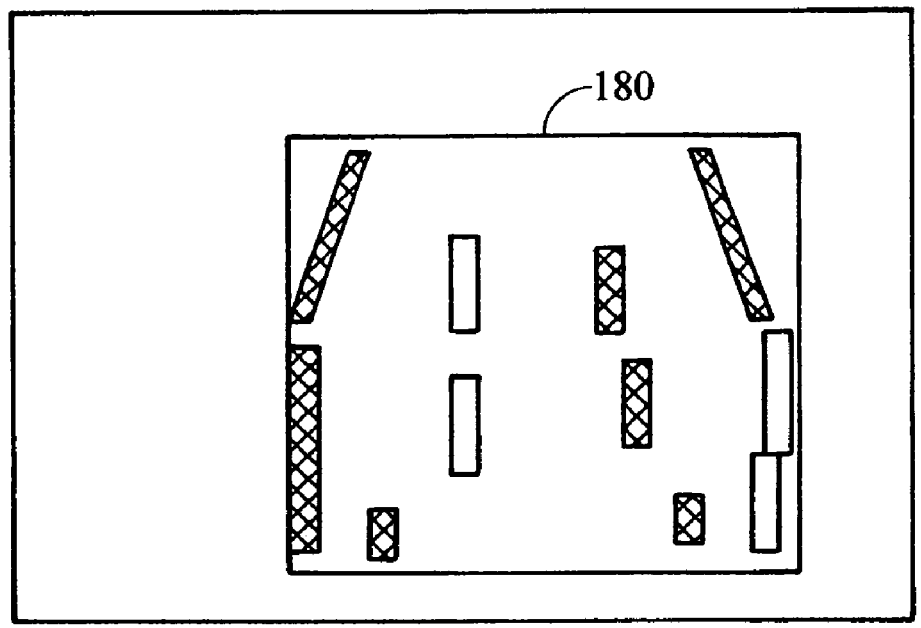
FIGS. 26a, b, and c are a series of images illustrating the addition and deletion of columns to perform template warping.
Figure 26B:
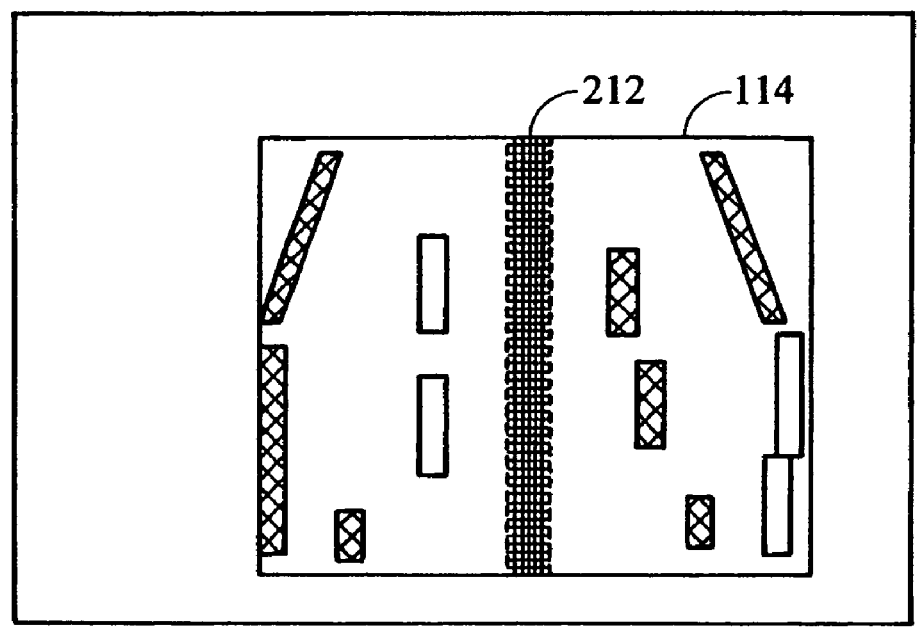
Figure 26C:
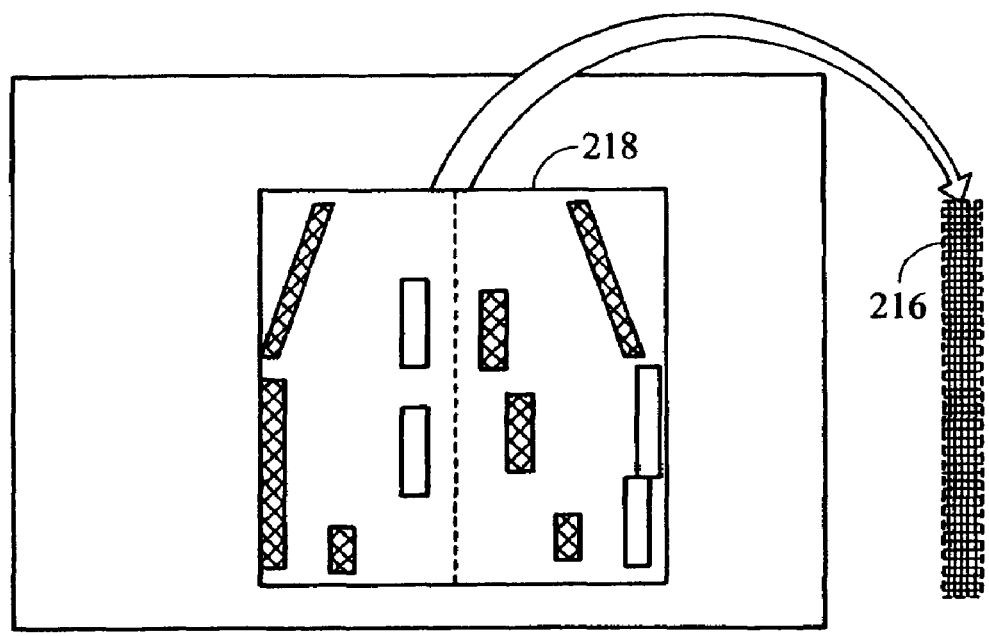

The cross correlation function Eq.(4) cannot express the size change of the object. The size change ratio can be used to determine the new range of the preceding vehicle. Further, a change in range may be estimated based on the change in size of the template that has the highest correlation value. Since the trinary image is a vertically enhanced edge image, the template 180, in FIG. 26*a* may be easily warped by adding columns 210 to the middle of the template 180 to form an expanded template 212, thereby accommodating for a vehicle that is closer to the camera as shown in FIG. 26*b*. In addition, columns 214 may be removed from the middle of the template 180 forming a constricted template 180 to accommodate for vehicles that have moved further away from the camera, as shown in FIG. 26*c*. The warped template, the power of the template and the power of the subset of the input image are given by Eqs.(5) through (8). As such, multiple columns may be subtracted or added from the template in a cross correlation performed at each size template.

$\overline{F}$: horizontally warped template, k columns are added/removed from the center from F(m,n) (5)

$$\overline{F} \equiv \{\overline{F}(m, n; k); 0 \le m < M + k = \overline{M}, 0 \le n < N\} \quad (6)$$

$$P_{\overline{F}} = \sum_m \sum_n \overline{F}(m, n; k)\overline{F}(m, n; k) \quad (7)$$

$$\overline{P}_I(x1, y1) = \sum_{0 \le m < \overline{M}} \sum_{0 \le n < N} I(m + x0 + x1, n + y0 + y1)I(m + x0 + x1, n + y0 + y1) \quad (8)$$

where $P_{\overline{F}}$, $\overline{M}$, and $\overline{P}_I$ are the power of the warped, the horizontal size of the warped template and the power of the subset of the input image, respectively.

Therefore, the non-normalized and normalized cross correlation functions between the warped template and the input pattern is introduced as follows:

$$C(x1, y1; k) = \sum_{0 \le m < \overline{M}} \sum_{0 \le n < N} \overline{F}(m, n; k)I(m + x0 + x1, n + y0 + y1) \quad (9)$$

$$C_n(x1, y1; k) = \frac{C(x1, y1; k)}{\sqrt{P_{\overline{F}} \overline{P}_I(x1, y1)}} \quad (10)$$

Figure 27:
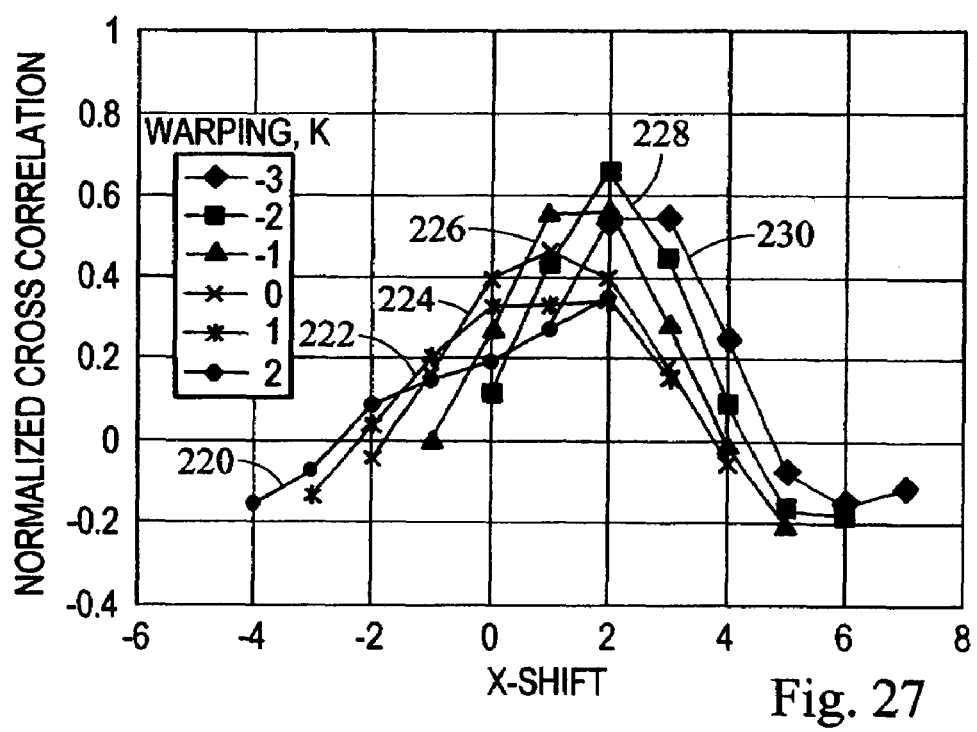
FIG. 27 is graph of the results of the cross correlation function including template warping.

$\overline{F}(m,n;k)$ is the horizontally warped template and k is the number of columns added or deleted, respectively. k=−1, 0 and 1 corresponds to the template modifications: delete_one_column, no change, and the add_one_column, respectively. The dependence of the cross correlation function on the warping number k is shown in FIG. 27. Line 220, 222, 224, 226, 228, and 230 represent the results for the cross correlation function using warped templates with 2 columns added, 1 column added, original template, 1 column deleted, 2 columns deleted, and 3 columns deleted respectively. The best value of $C_n(x1,y1;k)$ is searched by changing x1, y1 and k. Assume that the best set is (x1=x10, y=y10 and k=k0), basically the k0 gives the range change and x10 gives the lateral position change. The new range is calculated according to Eq.(11) and Eq.(12).

$$\text{Range\_new} = \text{Range\_template} * \text{Ratio} \quad (11)$$

$$\text{Ratio} = N_c \bigg/ \frac{N_c * C_n(x, y; 0) + (N_c + k) * C_n(x, y; k)}{C_n(x, y; 0) + C_n(x, y; k)} \quad (12)$$

where $N_c$ is the number of columns in the original template. The lateral position is calculated from x1=x10 since the each cell corresponds to the specific lateral position in the each range window. Since this matching does not depend on the vertical shift, |y1| is confined to less than or equal to 1. And the vehicle cannot move quickly, |x1| and |k| can be confined to less than or equal to 2. Namely the calculation of cross correlation function may be confined to an area equivalent to the object are in the template. These facts can avoid unnecessary calculation.

As such, the results of the pattern matching algorithm may be combined with the best object score calculated from the range-window algorithm, or alternatively the best correlation score may be used in place of the object score to identify the object as the preceding vehicle. Many different normalizing or weighting schemes can be envisioned to combine the correlation value and the object value should the processor be configured to determine the preceding vehicle based on a combination of the object score and the correlation score. In a simplest scenario, these scores could be normalized and added. Then, the resulting combined score may be compared to a combined score threshold value.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A system for determining a range of a vehicle, the system comprising:
    a camera configured to view a region of interest including the vehicle and generate an electrical image of the region;
    a processor in electrical communication with the camera to receive the electrical image, wherein the processor is configured to perform a pattern matching algorithm to identify the vehicle, and wherein the processor is configured to perform a vehicle identification algorithm to identify the vehicle and construct the template for the pattern matching algorithm based on the vehicle identification algorithm; and
    wherein the processor is configured to apply the pattern matching algorithm when the first algorithm produces a vehicle identity score below a score threshold.

2. The system according to claim 1, wherein the pattern matching algorithm comprises a cross correlation function between the electrical image and a template.

3. The system according to claim 2, wherein the electrical image is an edge enhanced trinary image.

4. The system according to claim 2, wherein the electrical image is a vertically edge enhanced image.

5. The system according to claim 2, wherein the processor is configured to scale the template relative to the electrical image to perform the pattern matching algorithm.

6. The system according to claim 5, wherein the processor is configured to scale the template by deleting columns from the template.

7. The system according to claim 5, wherein the processor is configured to scale the template by adding columns to the template.

8. The system according to claim 1, wherein the processor is configured to selectively identify the vehicle based on the vehicle identification algorithm and the pattern matching algorithm after the template is stored.

9. The system according to claim 1, wherein the processor is configured to store the template based on the first algorithm for use with subsequent images.

10. The system according to claim 1, wherein the vehicle identification algorithm is configured to construct a plurality of objects based on characteristics of the electrical image indicative of potential vehicle locations and calculate a score for each object of the plurality of objects.

11. The system according to claim 10, wherein the processor is configured to identify a plurality of windows within the electrical image, each window of the plurality of windows corresponding to a predetermined physical size at a target range from the camera, the processor being further configured to evaluate the plurality of objects in relation to each window to identify the vehicle.

12. The system according to claim 10, wherein the objects are constructed from edge segments generated based on the electrical image.

13. The system according to claim 12, wherein the edge segments are vertical edge segments.

14. The system according to claim 12, wherein the score is based on a height of the edge segments.

15. The system according to claim 12, wherein the score is based on a width of the edge segments.

16. The system according to claim 10, wherein the score is based on a height of the objects.

17. The system according to claim 10, wherein the score is based on a width of the objects.

18. A method for determining a range of a vehicle, the method comprising:
   performing a first algorithm to identify the vehicle
   constructing a template for a pattern matching algorithm based on the first algorithm;
   storing the template for use with subsequent images;
   generating an electrical image of a region including the vehicle; and
   performing the pattern matching algorithm to identify the vehicles;
   constructing a plurality of objects based on characteristics of the electrical image indicative of potential vehicle locations;
   calculating a score for each object of the plurality of objects; and
   wherein the step of performing the pattern matching algorithm is performed when the score for each object of the plurality of objects is lower than a score threshold.

* * * * *